US012593001B2

(12) United States Patent
Ikeda

(10) Patent No.: US 12,593,001 B2
(45) Date of Patent: Mar. 31, 2026

(54) INFORMATION PROCESSING APPARATUS, NON-TRANSITORY COMPUTER READABLE MEDIUM STORING PROGRAM, AND INFORMATION PROCESSING METHOD FOR ASSOCIATING FRONT SIDE AND BACK SIDE OF SHEET

(71) Applicant: FUJIFILM Business Innovation Corp., Tokyo (JP)

(72) Inventor: Kazutoshi Ikeda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 437 days.

(21) Appl. No.: 17/978,240

(22) Filed: Nov. 1, 2022

(65) Prior Publication Data

US 2023/0283734 A1 Sep. 7, 2023

(30) Foreign Application Priority Data

Mar. 4, 2022 (JP) ................................. 2022-033208

(51) Int. Cl.
*H04N 1/387* (2006.01)
*H04N 1/413* (2006.01)

(52) U.S. Cl.
CPC .......... *H04N 1/3876* (2013.01); *H04N 1/413* (2013.01)

(58) Field of Classification Search
CPC ............................. H04N 1/3876; H04N 1/413
USPC ......................................................... 382/284
See application file for complete search history.

(56) References Cited

U.S. PATENT DOCUMENTS

| | | | |
|---|---|---|---|
| 4,924,105 A | 5/1990 | Nagao | |
| 6,067,385 A | 5/2000 | Cullen et al. | |
| 6,348,980 B1 | 2/2002 | Cullen et al. | |
| 6,995,874 B1 | 2/2006 | Cullen et al. | |
| 7,748,633 B2 | 7/2010 | Hasuike | |
| 2014/0374486 A1* | 12/2014 | Collins, Jr. .......... G06V 30/142 |
| | | | 235/462.41 |
| 2015/0146983 A1 | 5/2015 | Sakawaki | |
| 2017/0230538 A1* | 8/2017 | Ono ................... H04N 1/00702 |
| 2018/0174324 A1 | 6/2018 | Miyauchi | |
| 2021/0258448 A1* | 8/2021 | Inoue ..................... H04N 1/393 |
| 2021/0281711 A1* | 9/2021 | Yana ..................... H04N 1/233 |

FOREIGN PATENT DOCUMENTS

| | | |
|---|---|---|
| JP | H0674968 | 9/1994 |
| JP | H10307908 | 11/1998 |
| JP | 2006339770 | 12/2006 |

(Continued)

OTHER PUBLICATIONS

"Notice of Reasons for Refusal of Japan Counterpart Application", issued on Jan. 20, 2026, with English translation thereof, p. 1-p. 8.

*Primary Examiner* — Gabriel I Garcia
(74) *Attorney, Agent, or Firm* — JCIPRNET

(57) ABSTRACT

An information processing apparatus includes a processor configured to receive first image data representing front sides of plural sheets, that is generated by one reading, receive second image data representing back sides of the plural sheets, that is generated by one reading, and associate a front side and a back side of each sheet with each other, based on a positional relationship between each sheet represented in the first image data and each sheet represented in the second image data.

20 Claims, 18 Drawing Sheets

(56)       References Cited

FOREIGN PATENT DOCUMENTS

| JP | 2007036755 | 2/2007 |
| JP | 2014064089 | 4/2014 |
| JP | 2015127936 | 7/2015 |
| JP | 2017143400 | 8/2017 |
| JP | 2018098705 | 6/2018 |

* cited by examiner

INFORMATION PROCESSING APPARATUS, NON-TRANSITORY COMPUTER READABLE MEDIUM STORING PROGRAM, AND INFORMATION PROCESSING METHOD FOR ASSOCIATING FRONT SIDE AND BACK SIDE OF SHEET

CROSS-REFERENCE TO RELATED APPLICATIONS

This application is based on and claims priority under 35 USC 119 from Japanese Patent Application No. 2022-033208 filed Mar. 4, 2022.

BACKGROUND

(i) Technical Field

The present invention relates to an information processing apparatus, a non-transitory computer readable medium storing a program, and an information processing method.

(ii) Related Art

Techniques for associating the front side and the back side of a sheet are known.

JP1998-307908A describes a method of associating the front side and the back side of a sheet, based on the show-through image of the sheet.

JP2007-36755A describes a system that acquires first identification information that identifies a first medium side and second identification information that identifies a second medium side and is associated with the first identification information, generates a first code image to be printed on the first medium side from the first identification information, and generates a second code image to be printed on the second medium side from the second identification information.

JP674968B describes an apparatus that determines whether or not a specific object is included in both a first image and a second image of a printed material, and determines a combination of a front side image and a back side image of the printed material, based on the determination result.

SUMMARY

Aspects of non-limiting embodiments of the present disclosure relate to an information processing apparatus, a non-transitory computer readable medium storing a program, and an information processing method that in a case where front sides and back sides of a plurality of sheets are associated with each other, even in a case where a mark or a text for the association is not printed on each sheet in advance, the front side and the back side of each sheet are associated.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to receive first image data representing front sides of a plurality of sheets, that is generated by one reading, receive second image data representing back sides of the plurality of sheets, that is generated by one reading, and associate a front side and a back side of each sheet with each other, based on a positional relationship between each sheet represented in the first image data and each sheet represented in the second image data.

BRIEF DESCRIPTION OF THE DRAWINGS

Exemplary embodiment(s) of the present invention will be described in detail based on the following figures, wherein.

DETAILED DESCRIPTION

Figure 1:
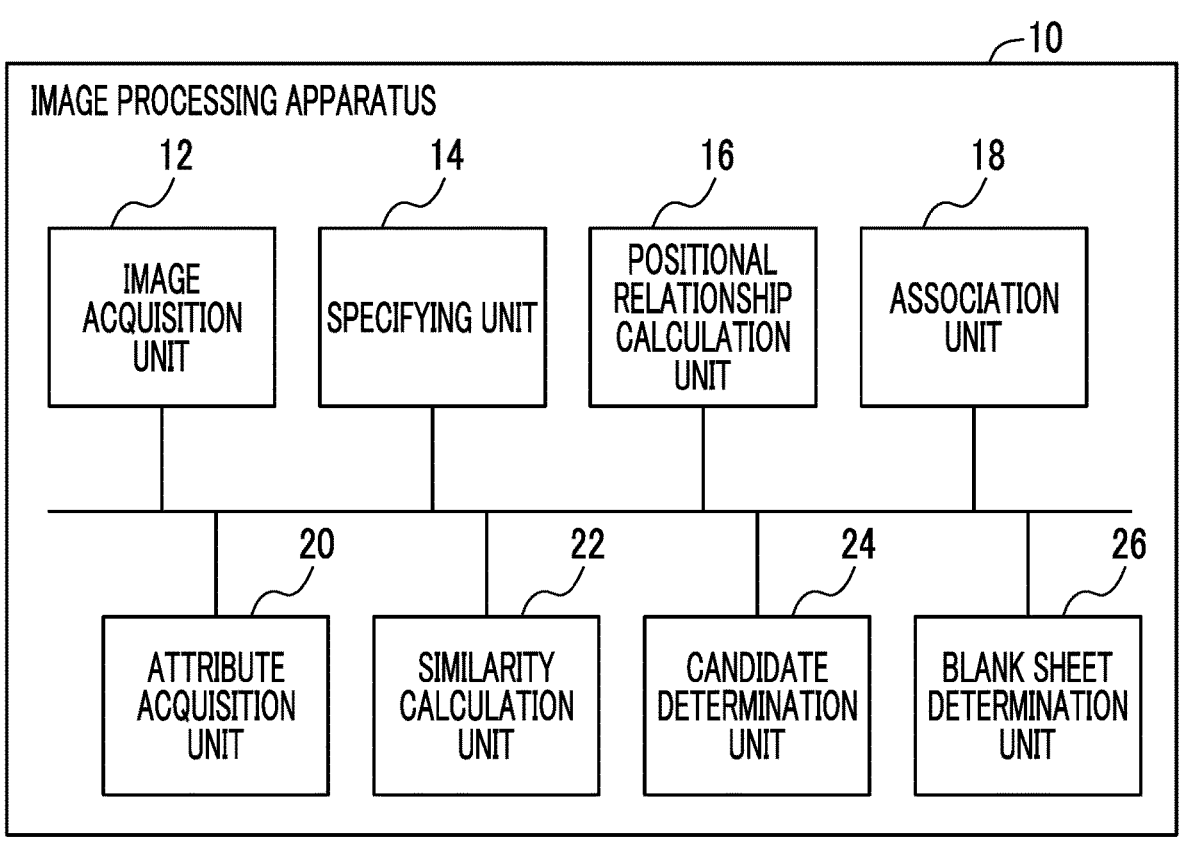
FIG. 1 is a block diagram showing the configuration of an image processing apparatus.

An image processing apparatus according to exemplary embodiments will be described with reference to FIG. 1. FIG. 1 is a block diagram showing an example of the configuration of an image processing apparatus 10 according to exemplary embodiments.

The image processing apparatus 10 receives first image data representing one side of a sheet and second image data representing the other side of the sheet, and associates the front side and the back side of the sheet. For example, the one side is the front side of the sheet and the other side is the back side of the sheet.

The first image data representing the front sides of the plurality of sheets are generated by one reading. Similarly, the second image data representing the back sides of the plurality of sheets are generated by one reading. The image processing apparatus 10 associates the front side and the back side of each sheet, based on the first image data and the second image data.

Reading of the sheet is scanning with a scanner or imaging with a camera. The one reading refers to scanning a plurality of sheets at once (that is, scanning a plurality of sheets together) or imaging a plurality of sheets together.

For example, a scanner scans the front sides of a plurality of sheets at once to generate first image data representing the front sides of the plurality of sheets. Similarly, the scanner scans the back sides of a plurality of sheets at once to generate second image data representing the back sides of the plurality of sheets. In a case where a camera is used, the first image data and the second image data are generated in the same manner.

The sheet to be read is not particularly limited. For example, the sheet is a form (for example, a ledger or slip), a business card, a receipt, other documents or word documents, and the like.

The reading may be performed by the image processing apparatus 10 or may be performed by an external device other than the image processing apparatus 10. In a case where reading is performed by an external device, the first image data and the second image data are transmitted from the external device to the image processing apparatus 10.

As shown in FIG. 1, the image processing apparatus 10 includes, for example, an image acquisition unit 12, a specifying unit 14, a positional relationship calculation unit 16, an association unit 18, an attribute acquisition unit 20, a similarity calculation unit 22, a candidate determination unit 24, and a blank sheet determination unit 26.

The image acquisition unit 12 acquires first image data and second image data. In a case where the reading is performed by the image processing apparatus 10, the image acquisition unit 12 acquires the first image data and the second image data generated by the reading. In a case where the reading is performed by an external device other than the image processing apparatus 10, the image acquisition unit 12 acquires the first image data and the second image data from the external device. The image acquisition unit 12 may receive the first image data and the second image data from an external device via a communication path such as the Internet or a Local Area Network (LAN), or may acquire the first image data and the second image data via a portable recording medium (for example, a USB memory, or the like).

The specifying unit 14 specifies the area of each sheet represented by each of the first image data and the second image data. Specifically, the specifying unit 14 specifies the area of the front side of each sheet represented in the first image data, and specifies the area of the back side of each sheet represented in the second image data. A known technique is used as a technique for specifying the area of the sheet from the image data. For example, the specifying unit 14 extracts the outlines of the front sides of the sheets represented in the first image data, and specifies the areas surrounded by the outlines as the areas of the front sides. Similarly, the specifying unit 14 extracts the outlines of the back sides of the sheets represented in the second image data, and specifies the areas surrounded by the outline as the areas of the back sides. Hereinafter, the area of the front side of the sheet will be referred to as the "front-side area", and the area of the back side of the sheet will be referred to as the "back-side area".

The positional relationship calculation unit 16 calculates the positional relationship between each sheet represented in the first image data and each sheet represented in the second image data. For example, the positional relationship calculation unit 16 calculates the positional relationship between each front-side area and each back-side area. The concept of positional relationship includes a relative positional relationship and a distance relationship.

A relative positional relationship is a relative positional relationship between each sheet represented in the first image data and each sheet represented in the second image data. For example, the positional relationship calculation unit 16 calculates the relative positional relationship between sheets represented in the first image data (hereinafter referred to as "first relative positional relationship") and calculates the relative positional relationship between sheets represented in the second image data (hereinafter referred to as "second relative positional relationship"). The positional relationship calculation unit 16 compares the first relative positional relationship with the second relative positional relationship to calculate the relative positional relationship between each sheet represented in the first image data and each sheet represented in the second image data. Specifically, the positional relationship calculation unit 16 calculates the relative positional relationship between the front-side areas as a first relative positional relationship, calculates the relative positional relationship between the back-side areas as a second relative positional relationship, and calculates the relative positional relationship between each front-side area and each back-side area.

The distance relationship is the distance relationship between each sheet represented in the first image data and each sheet represented in the second image data. The positional relationship calculation unit 16 calculates a distance from the position that is reference (hereinafter referred to as "reference position") to each sheet in the first image data, and calculates a distance from the reference position to each sheet in the second image data. For example, the positional relationship calculation unit 16 calculates the distance from the reference coordinates (that is, the reference position) to the coordinates of each sheet (for example, the center coordinates) in the first image data, and calculates the distance from the reference coordinates to the coordinates of each sheet (for example, the center coordinates) in the second image data. The positional relationship calculation unit 16 compares the distance to each sheet calculated based on the first image data with the distance to each sheet calculated based on the second image data, and calculates the distance relationship between each sheet represented in the first image data and each sheet represented in the second image data. The distance relationship is, for example, a distance difference (that is, positional deviation). For example, the positional relationship calculation unit 16 calculates, for each sheet, the difference between the distance of each sheet represented in the first image data and the distance of each sheet represented in the second image data, as the distance relationship. Specifically, the positional relationship calculation unit 16 calculates the distance from the reference position to each front-side area, calculates the distance from the reference position to each back-side area, and calculates the difference between these distances as the distance relationship.

The association unit 18 associates the front side of each sheet represented in the first image data with the back side of each sheet represented in the second image data, based on the positional relationship calculated by the positional relationship calculation unit 16. The data indicating the association may be stored in the image processing apparatus 10, transmitted to a device other than the image processing apparatus 10, or displayed on a display.

In a case where a relative positional relationship is used as the positional relationship, the association unit 18 associates the front side and the back side, which are represented at relatively the same position in the first image data and the second image data, as the sides of the same sheet.

In a case where a distance relationship is used as the positional relationship, the association unit 18 associates the front side and the back side, as the sides of the same sheet, based on the distance difference for each sheet. For example, the association unit 18 associates the front side and the back side with the smallest distance difference (that is, the smallest positional deviation), as the sides of the same sheet.

The attribute acquisition unit 20 acquires data indicating attributes of each sheet represented in the first image data and data indicating attributes of each sheet represented in the second image data. Examples of the attributes of a sheet include the size, shape, and color of a sheet, a fingerprint mark attached to a sheet, material and thickness of a sheet, and the like. For example, the attribute acquisition unit 20 analyzes the first image data to specify the attributes of each sheet represented in the first image data, and analyzes the second image data to specify the attributes of each sheet represented in the second image data.

The similarity calculation unit 22 calculates the similarity between the attribute of each sheet obtained from the first image data and the attribute of each sheet obtained from the second image data. The similarity is a value that indicates the degree of similarity between the attribute of the sheet obtained from the first image data and the attribute of the sheet obtained from the second image data.

The candidate determination unit 24 determines sheet candidates to be associated by the association unit 18, based on at least one of the positional relationship or attribute similarity of the sheet.

The blank sheet determination unit 26 determines whether or not the front side of the sheet is blank, based on the first image data, and determines whether or not the back side of the sheet is blank, based on the second image data. The blank sheet determination unit 26 may determine whether or not the sheet is blank for both the front side and the back side, or may determine whether or not the sheet is blank for either the front side or the back side. For example, the blank sheet determination unit 26 determines whether or not the sheet is blank, based on the pixel values.

Note that the attribute acquisition unit 20, the similarity calculation unit 22, the candidate determination unit 24, and the blank sheet determination unit 26 may not be included in the image processing apparatus 10. In other words, the image processing apparatus 10 may not include these functions.

Figure 2:
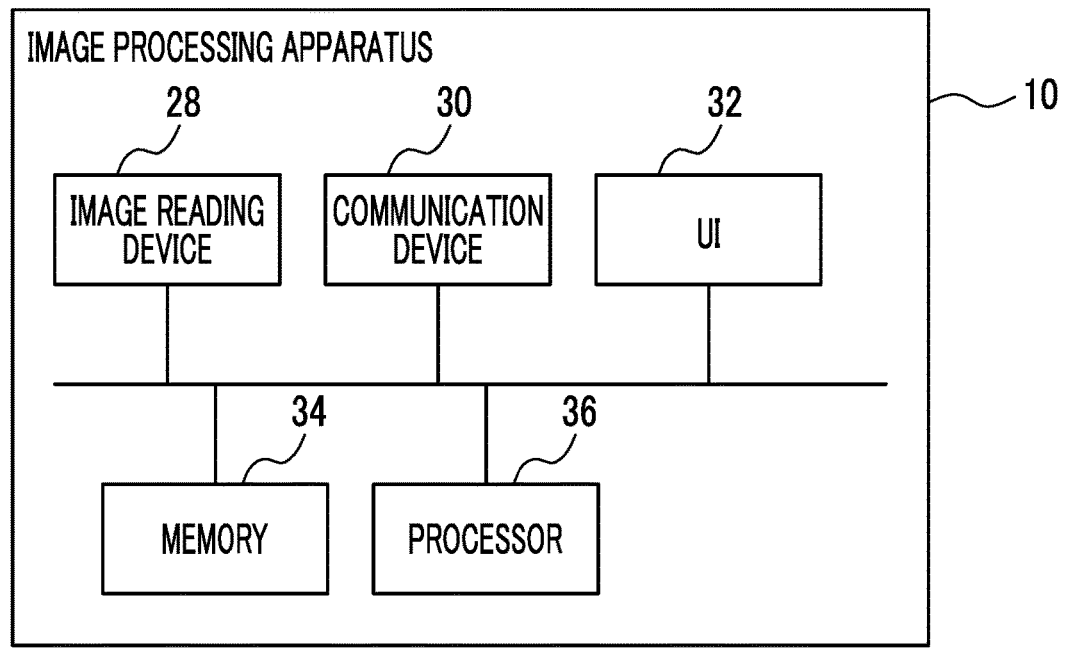
FIG. 2 is a block diagram showing the hardware configuration of the image processing apparatus.

Hereinafter, the hardware configuration of the image processing apparatus 10 will be described with reference to FIG. 2. FIG. 2 is a block diagram showing an example of the hardware configuration of the image processing apparatus 10.

The image processing apparatus 10 includes, for example, an image reading device 28, a communication device 30, a user interface (UI) 32, a memory 34, and a processor 36.

The image reading device 28 is a scanner or a camera, and generates image data representing the sheet by reading the sheet. The image reading device 28 reads the front sides of a plurality of sheets at a time to generate first image data representing the front sides of the plurality of sheets, and reads the back sides of the plurality of sheets at a time to generate second image data representing the back sides of the plurality of sheets. In a case where the image reading device 28 is a scanner, the type of the scanner is not particularly limited. For example, a flat head scanner or the like is used as the scanner.

Although the image reading device 28 is included in the image processing apparatus 10 in the example shown in FIG. 2, the image reading device 28 may not be included in the image processing apparatus 10. In this case, the image processing apparatus 10 acquires the first image data and the second image data from the external device.

The communication device 30 includes one or a plurality of communication interfaces having a communication chip, a communication circuit, and the like, and has a function of transmitting information to other apparatuses and a function of receiving information transmitted from other apparatuses. The communication device 30 may have a wireless communication function such as short-range wireless communication or Wi-Fi, or may have a wired communication function.

The UI 32 is a user interface, and includes a display and an input device. The display is a liquid crystal display or an EL display. The input device is a keyboard, a mouse, input keys, an operation panel, or the like. The UI 32 may be a UI such as a touch panel that has both a display and an input device.

The memory 34 is a device that configures one or a plurality of storage areas for storing data. The memory 34 is, for example, a hard disk drive (HDD), a solid state drive (SSD), various types of memory (for example, a RAM, a DRAM, an NVRAM, a ROM, or the like), other storage devices (for example, an optical disk, or the like), or combinations thereof.

The processor 36 controls the operation of each unit of the image processing apparatus 10.

The image acquisition unit 12, the specifying unit 14, the positional relationship calculation unit 16, the association unit 18, the attribute acquisition unit 20, the similarity calculation unit 22, the candidate determination unit 24, and the blank sheet determination unit 26 are implemented by the processor 36.

Hereinafter, exemplary embodiments will be described in detail with specific examples. As an example below, the image reading device 28 is a flat head scanner having a platen glass, and a plurality of sheets are arranged on the platen glass. The image reading device 28 scans a plurality of sheets arranged on the platen glass at once to generate image data representing the plurality of sheets.

The plurality of sheets are placed on the platen glass by the user such that the one side (for example, the front side) of each of the plurality of sheets is scanned, and the one side is scanned by the image reading device 28. Thereby, the first image data is generated.

Each sheet is turned over and the plurality of sheets are placed on the platen glass by the user such that the other side (for example, the back side) of each of the plurality of sheets is scanned, and the other side is scanned by the image reading device 28. Thereby, the second image data is generated.

The first image data and the second image data to be associated with the front side and the back side may be designated by the user. For example, a list of images may be displayed on the display of the UI 32, and the user may select the first image data and the second image data from the list. For example, an image such as an icon representing the function of association is displayed on the display of the UI 32, and in a case where the image is pressed by the user, a list of candidate images for association is displayed on the display.

Further, in a case where two consecutive scans are performed, the processor 36 may define the image data generated by the first scan as the first image data, and define the image data generated by the second scan as the second image data. Two consecutive scans are, for example, a series of scans in which the length of time between the end of the first scan and the start of the second scan is equal to or less than a threshold.

In a case where an image such as an icon representing the function of association is pressed by the user and then two consecutive scans are performed, the processor 36 may define the image data generated by the first scan as the first image data, and define the image data generated by the second scan as the second image data. In this case, unless execution of the function is canceled, the processor 36 may define the image data generated by the first scan as the first image data and define the image data generated by the second scan as the second image data, regardless of the length of time between the end of the first scan and the start of the second scan.

Figure 3:
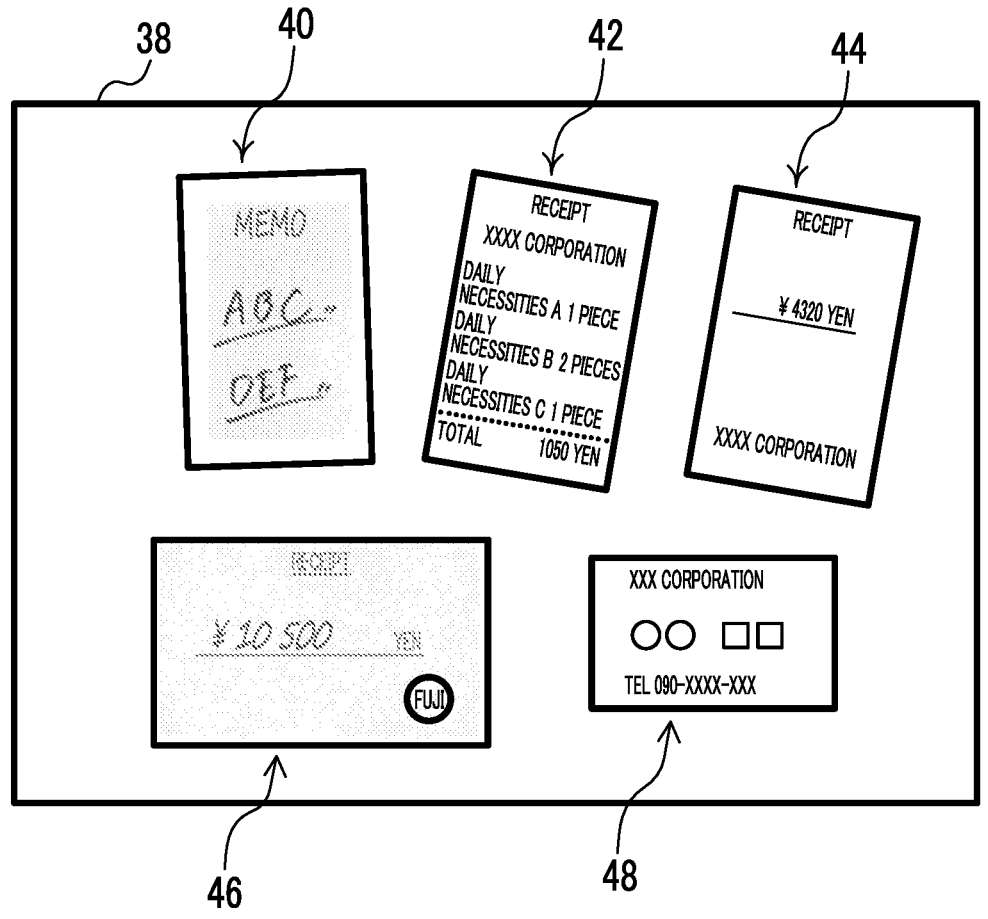
FIG. 3 is a diagram showing a result of scanning a front side.

FIG. 3 shows the results of scanning a front side. Specifically, a first image 38 based on the first image data is shown. Front sides 40, 42, 44, 46, and 48 are represented in the first image 38. The front side 40 is the front side of a sheet A, the front side 42 is the front side of a sheet B, the front side 44 is the front side of a sheet C, the front side 46 is the front side of a sheet D, and the front side 48 is the front side of a sheet E. Sheets A, B, C, D and E are placed on the platen glass and scanned by the image reading device 28 such that the respective front sides of the sheets A, B, C, D and E are scanned.

The processor 36 extracts the outline of each of the front sides 40, 42, 44, 46, and 48 represented in the first image 38, and specifies the front-side area of each of the front sides 40, 42, 44, 46, and 48.

Figure 4:
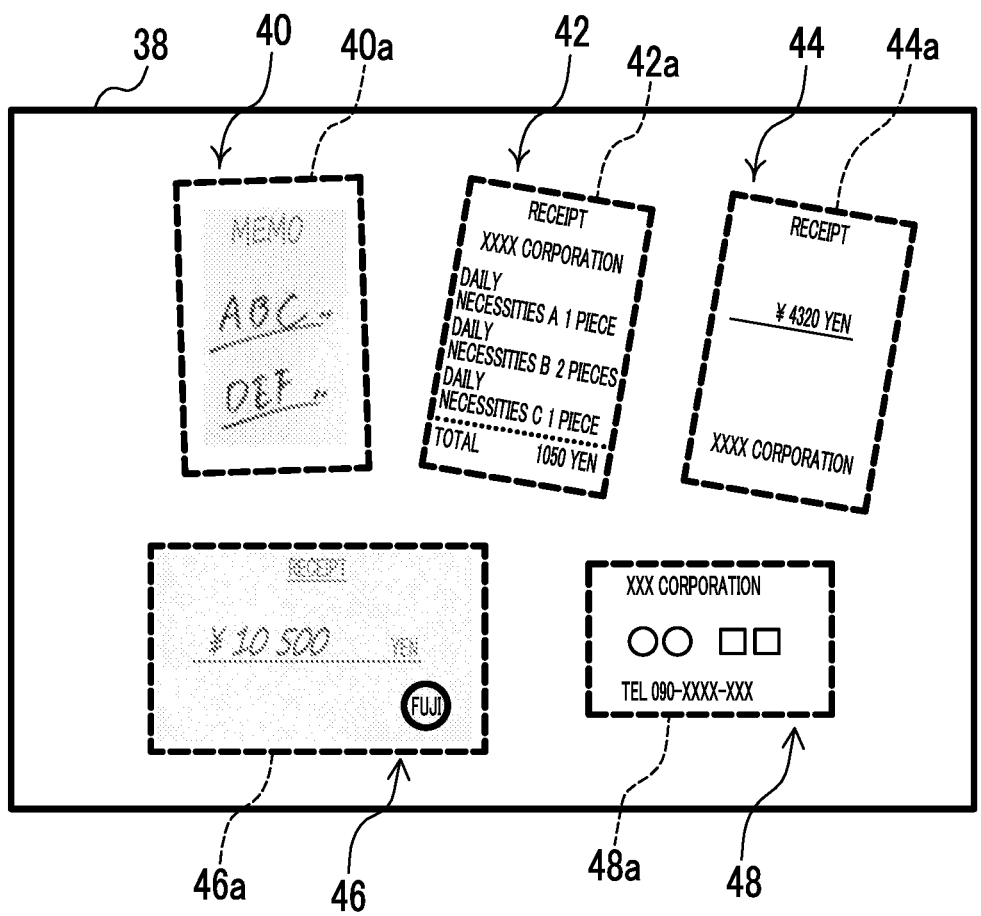
FIG. 4 is a diagram showing areas of the front sides.

In FIG. 4, the front-side area of each front side is indicated by a dashed line. A front-side area 40a is an area surrounded by the outline of the front side 40. A front-side area 42a is the area surrounded by the outline of the front side 42. A front-side area 44a is the area surrounded by the outline of the front side 44. A front-side area 46a is the area surrounded by the outline of the front side 46. A front-side area 48a is the area surrounded by the outline of the front side 48.

Figure 5:
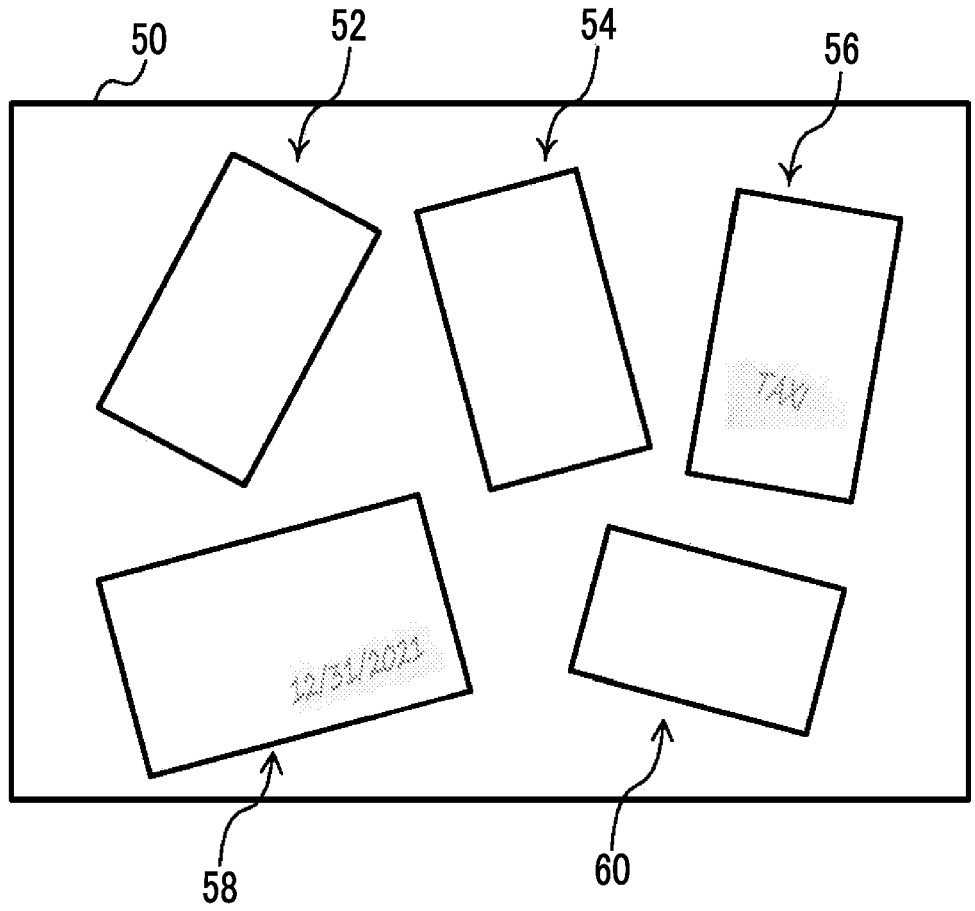
FIG. 5 is a diagram showing a result of scanning a back side.

FIG. 5 shows the result of scanning the back side. Specifically, a second image 50 based on the second image data is shown. The back sides 52, 54, 56, 58, and 60 are represented in the second image 50. The back side 52 is the back side of the sheet A, the back side 54 is the back side of the sheet B, the back side 56 is the back side of the sheet C, the back side 58 is the back side of the sheet D, and the back side 60 is the back side of the sheet E. Sheets A, B, C, D and E are placed on the platen glass and scanned by the image reading device 28 such that the respective back sides of the sheets A, B, C, D and E are scanned.

The processor 36 extracts the outline of each of the back sides 52, 54, 56, 58, and 60 represented in the second image 50, and specifies the back-side area of each of the back sides 52, 54, 56, 58, and 60.

Figure 6:
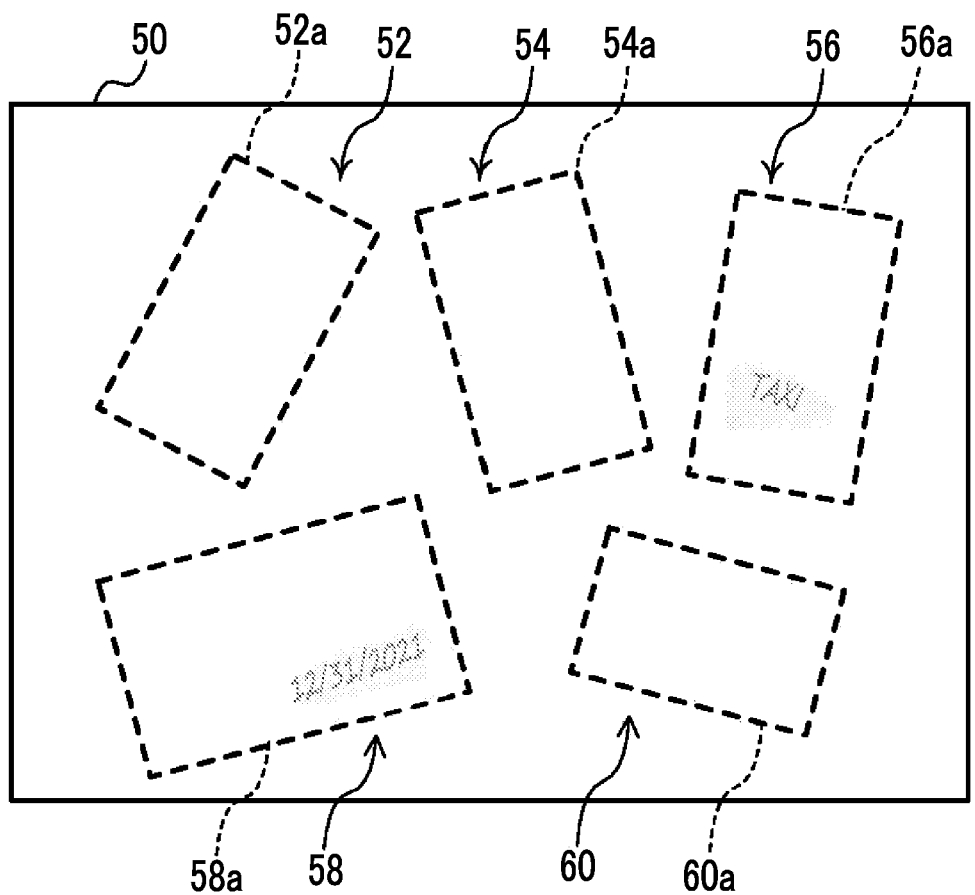
FIG. 6 is a diagram showing areas of the back sides.

In FIG. 6, the back-side area of each back side is indicated by a dashed line. A back-side area 52a is an area surrounded by the outline of the back side 52. A back-side area 54a is an area surrounded by the outline of the back side 54. A back-side area 56a is an area surrounded by the outline of the back side 56. A back-side area 58a is an area surrounded by the outline of the back side 58. A back-side area 60a is an area surrounded by the outline of the back side 60.

In a case of scanning the back side after scanning the front side, it is conceivable to turn the sheet over. In this case, the inclination and position of the sheet may change between when the front side is scanned and when the back side is scanned. With reference to FIGS. 3 and 5, the inclinations and positions of each sheet are different between when the front side is scanned and when the back side is scanned.

Note that the user may manually specify the front-side area and the back-side area of each sheet.

A process of associating the front side and the back side of each sheet, based on a positional relationship between each sheet represented in the first image data and each sheet represented in the second image data will be described below.

Figure 7:
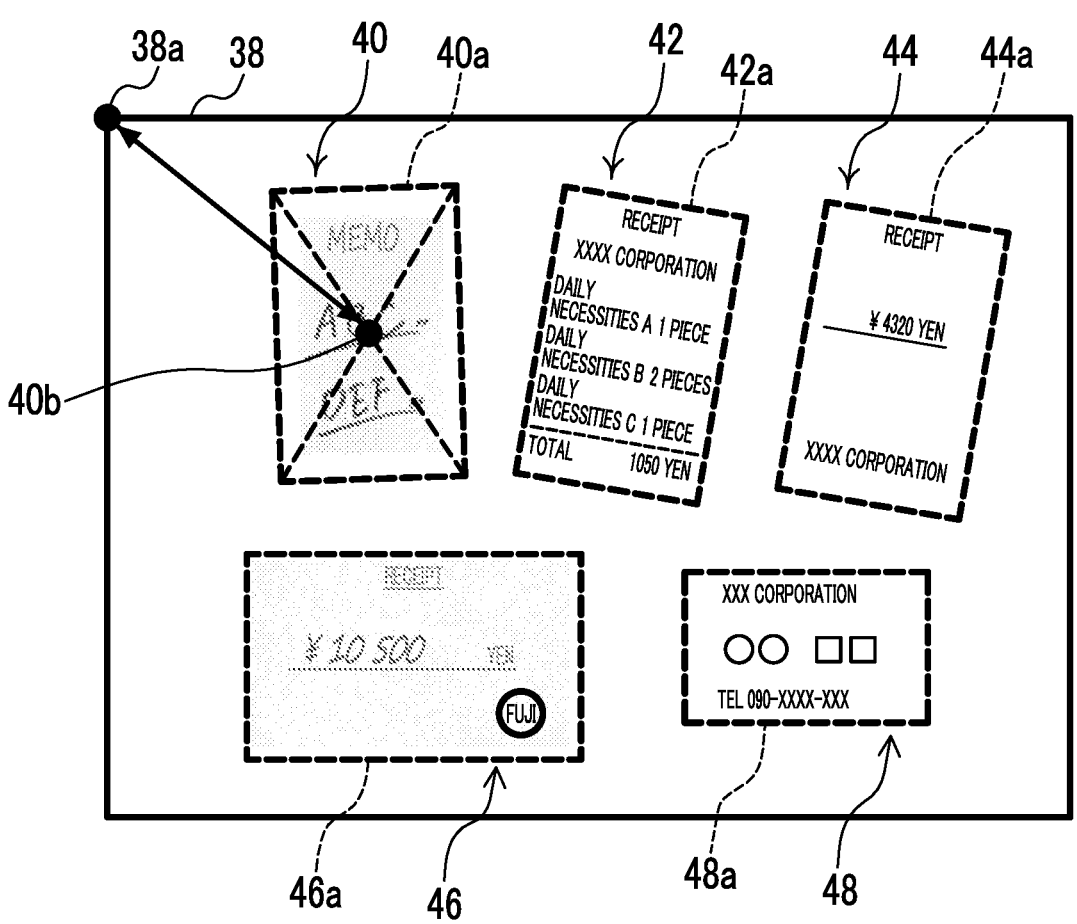
FIG. 7 is a diagram showing the areas of the front sides.
Figure 8:
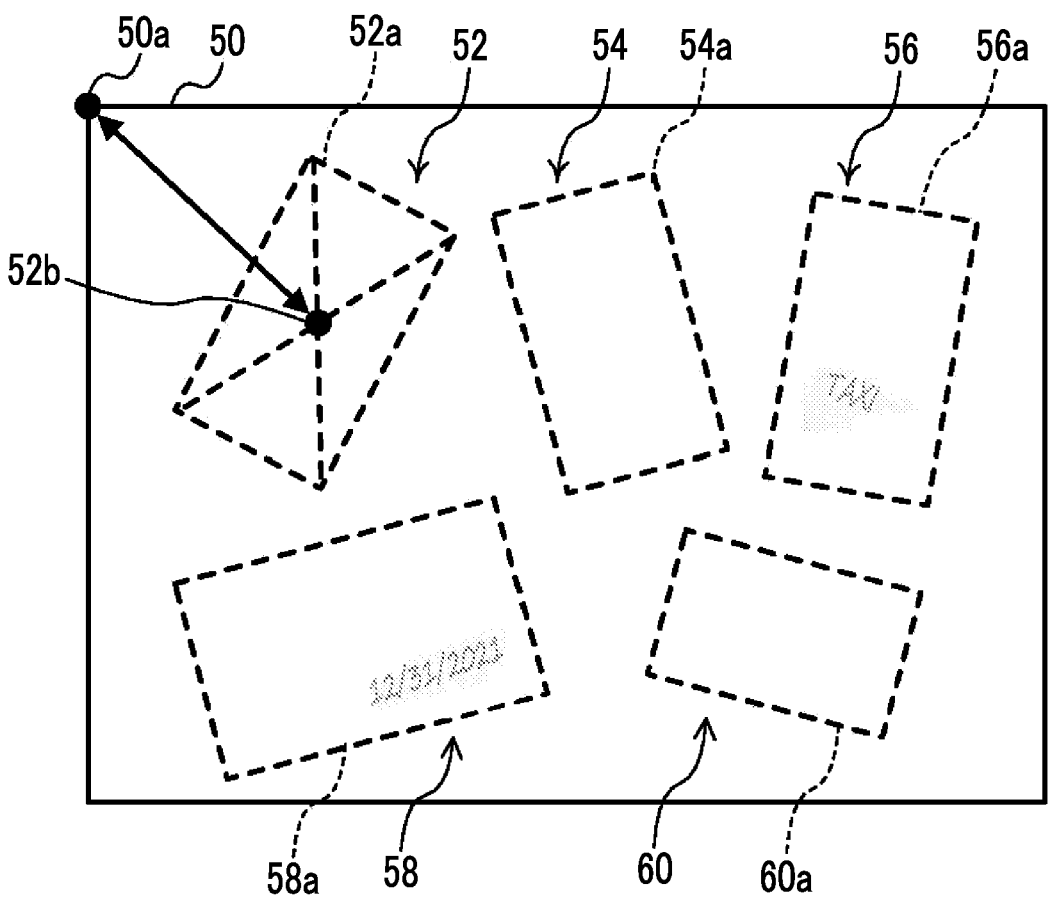
FIG. 8 is a diagram showing the areas of the back sides.
Figure 9:
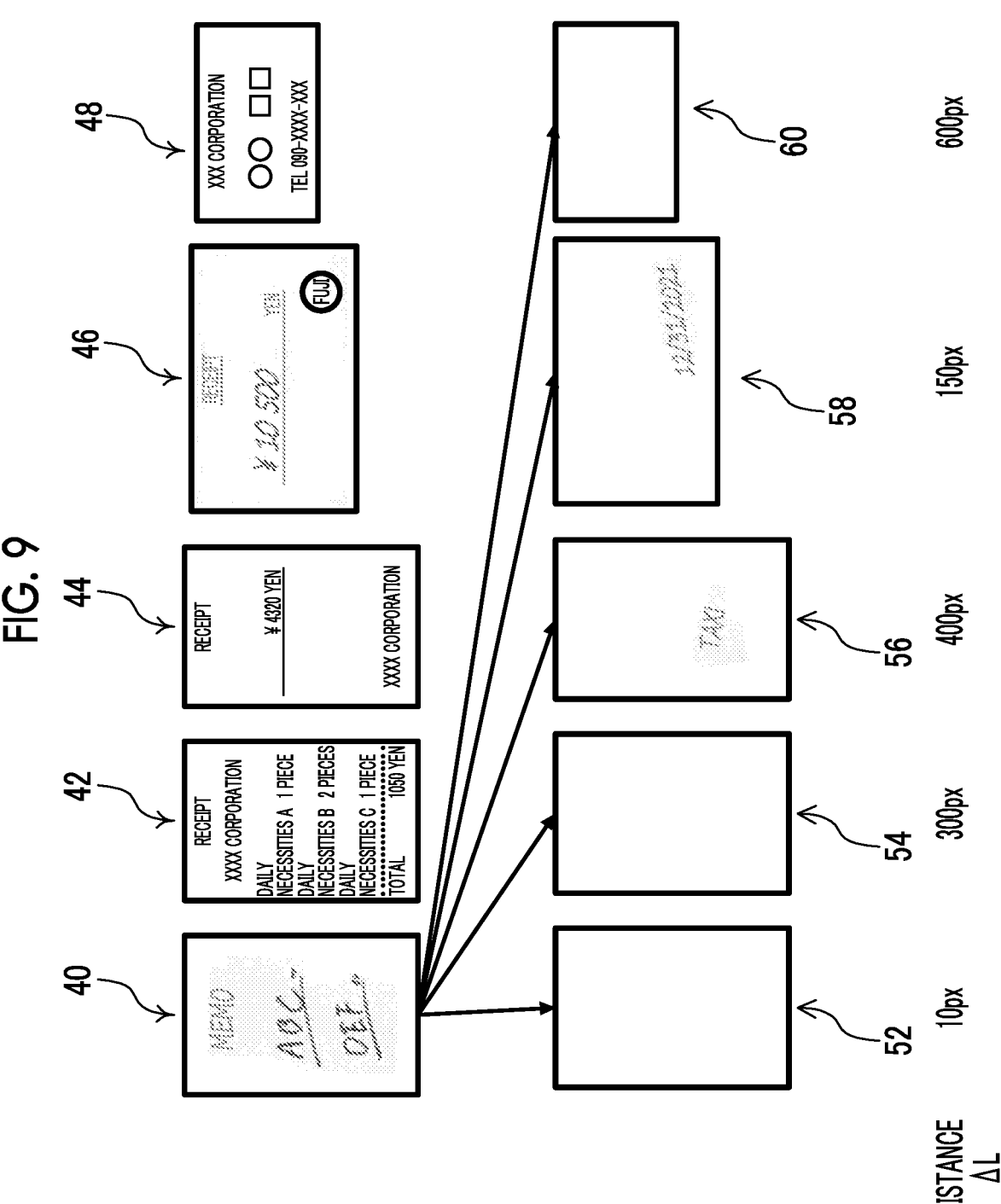
FIG. 9 is a diagram showing a distance between the front side and the back side.

Referring to FIGS. 7 to 9, the process of associating the front side and the back side of each sheet based on the distance relationship will be described. FIG. 7 is a diagram showing the areas of the front sides. FIG. 8 is a diagram showing the areas of the back sides. FIG. 9 is a diagram showing the distances between the front sides and the back sides.

A reference position 38a is defined on the first image 38, as shown in FIG. 7. The reference position 38a may be a predetermined position or a position designated by the user. For example, a two-dimensional coordinate system is defined, and the origin of the coordinate system is defined as the reference position 38a. In the example shown in FIG. 7, one vertex of the first image 38 forming a rectangular region as a whole is defined as the reference position 38a.

The processor 36 calculates the distance between the reference position 38a and the front-side area on the first image 38, for each front-side area. For example, the processor 36 calculates, for each front-side area, the distance between the coordinates on the front-side area (for example, center coordinates, barycentric coordinates, or specific coordinates on the front side (for example, vertex, or the like)) and the reference position 38a.

In the example shown in FIG. 7, the processor 36 calculates the distance between the center coordinates 40b of the front-side area 40a of the front side 40 and the reference position 38a as the distance between the front-side area 40a and the reference position 38a. The distances are similarly calculated for other front-side areas. Hereinafter, the distance between the front-side area 40a and the reference position 38a will be referred to as a distance Ls1, the distance between the front-side area 42a and the reference position 38a will be referred to as a distance Ls2, the distance between the front-side area 44a and the reference position 38a will be referred to as a distance Ls3, the distance between the front-side area 46a and the reference position 38a will be referred to as a distance Ls4, and the distance between the front-side area 48a and the reference position 38a will be referred to as a distance Ls5.

With respect to the back sides, the processor 36 similarly calculates the distances between the reference position and the back-side areas. The reference position for the back side has the same coordinates as the reference position 38a for the front side.

As shown in FIG. 8, the processor 36 calculates the distance between the center coordinates 52b of the back-side area 52a of the back side 52 and the reference position 50a as the distance between the back-side area 52a and the reference position 50a. The reference position 50a has the same coordinates as the reference position 38a. Distances are similarly calculated for other back-side areas. Hereinafter, the distance between the back-side area 52a and the reference position 50a will be referred to as a distance Lb1, the distance between the back-side area 54a and the reference position 50a will be referred to as a distance Lb2, the distance between the back-side area 56a and the reference position 50a will be referred to as a distance Lb3, the distance between the back-side area 58a and the reference position 50a will be referred to as a distance Lb4, and the distance between the back-side area 60a and the reference position 50a will be referred to as a distance Lb5.

The processor 36 calculates the difference between the distance of each front-side area and the distance of each back-side area as a distance relationship.

FIG. 9 shows a specific example of the distance relationship. The processor 36 calculates the difference ΔL between the distance Ls1 of the front-side area 40a of the front side 40 and the distance of the back-side area of each back side. The difference ΔL between the distance Ls1 of the front-side area 40a and the distance Lb1 of the back-side area 52a is 10 pixels (px). A difference ΔL between the distance Ls1 and the distance Lb2 of the back-side area 54a is 300 px. A difference ΔL between the distance Ls1 and the distance Lb3 of the back-side area 56a is 400 px. A difference ΔL between the distance Ls1 and the distance Lb4 of the back-side area 58a is 150 px. A difference ΔL between the distance Ls1 and the distance Lb5 of the back-side area 60a is 600 px. The difference ΔL is a value corresponding to the positional deviation.

The processor 36 specifies the back-side area having the smallest difference ΔL from the distance Ls1 of the front-side area 40a, and associates the front side 40 from which the front-side area 40a is extracted and the back side from which the back-side area is extracted as the sides of the same sheet. In the example shown in FIG. 9, the difference ΔL for the back-side area 52a of the back side 52 is 10 px, which is the smallest value. Therefore, processor 36 associates the front side 40 and the back side 52 as the sides of the same sheet.

In a case where each sheet is turned over to scan the back side after scanning the front side, for the same sheet, it is assumed that the sheet is placed in almost the same position between when the front side is scanned and when the back side is scanned. Based on the assumption, the processor 36 associates the front side 40 and the back side 52 with the smallest difference ΔL as the sides of the same sheet.

For example, the processor 36 extracts image data representing the front side 40 from the first image data, extracts image data representing the back side 52 from the second image data, and associates the image data representing the front side 40 and the image data representing back side 52 to store the associated image data in the memory 34. The processor 36 may associate the image data representing the front side 40 with the image data representing the back side 52 and transmit the associated image data to an external device or display the associated image data on a display.

The processor 36 similarly specifies the combination of the front side and the back side that form the smallest distance difference ΔL for the other sheets, and associates the front side and the back side with each other.

By using the distance relationship, even in a case where the number of sheets differs between when reading the front side and when reading the back side, the front side and the back side are associated.

Figure 10:
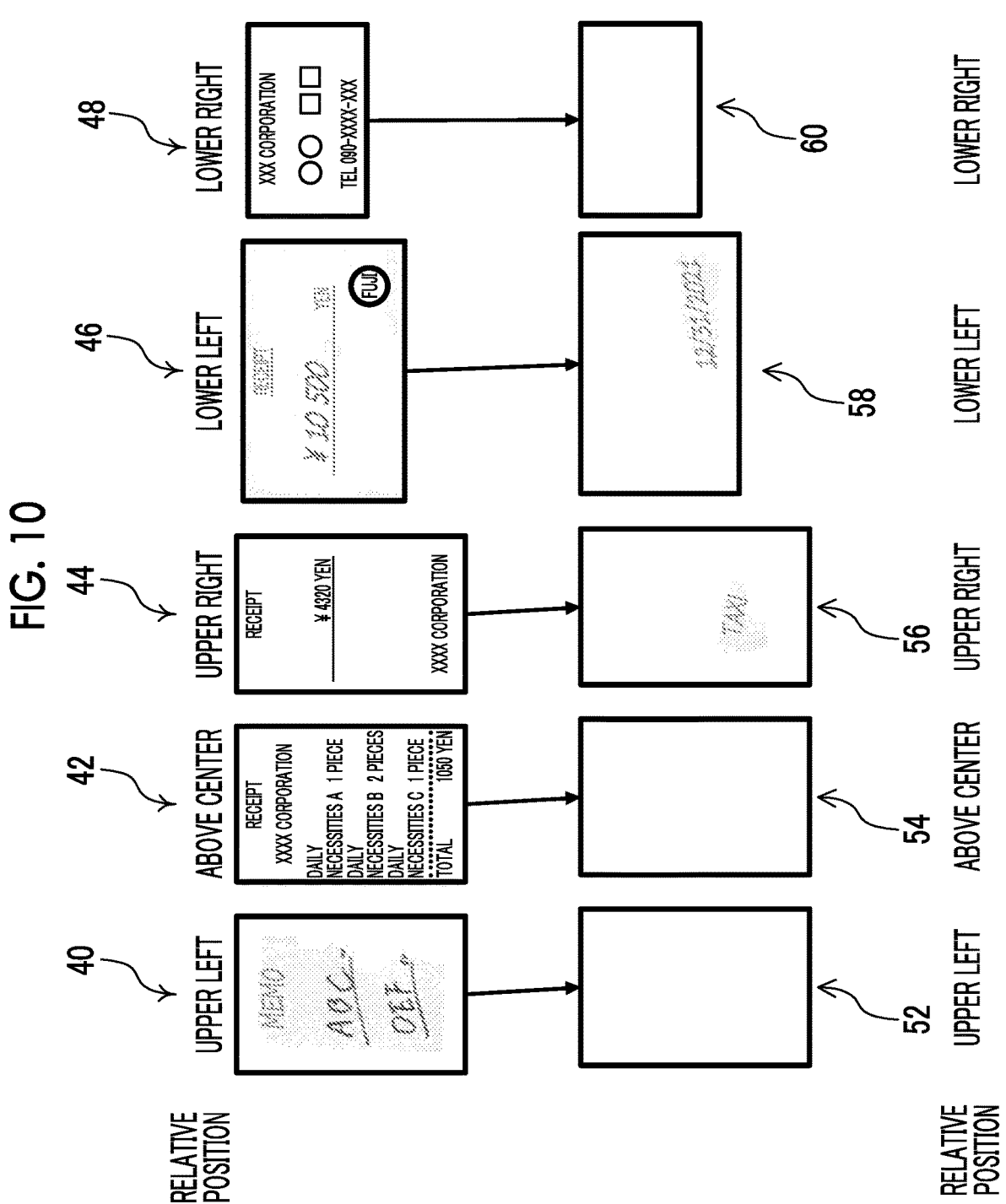
FIG. 10 is a diagram showing a relative positional relationship between the front side and the back side.

With reference to FIGS. 4, 6 and 10, a process of associating the front side and the back side of each sheet will be described below, based on the relative positional relationship between each sheet represented in the first image data and each sheet represented in the second image data. FIG. 10 is a diagram showing the relative positional relationship between the front side and the back side.

The processor 36 calculates the relative positional relationship between the front-side areas specified from the first image 38 as the first relative positional relationship, and calculates the relative positional relationship between the back-side areas specified from the second image 50 as the second relative positional relationship.

For example, the processor 36 specifies the relative position of each front-side area with reference to the center of the first image 38 shown in FIG. 4. The front-side area 40a is placed at the upper left, the front-side area 42a is placed above the center, the front-side area 44a is placed at the upper right, the front-side area 46a is placed at the lower left, and the front-side area 48a is placed at the lower right. The processor 36 calculates these positional relationships as the first relative positional relationship.

Similarly for the back side, the processor 36 specifies the relative position of each back-side area with reference to the center of the second image 50 shown in FIG. 6. The back-side area 52a is placed at the upper left, the back-side area 54a is placed above the center, the back-side area 56a is placed at the upper right, the back-side area 58a is placed at the lower left, and the back-side area 60a is placed at the lower right. The processor 36 calculates these positional relationships as the second relative positional relationship.

The processor 36 compares the first relative positional relationship with the second relative positional relationship to calculate the relative positional relationship between each sheet represented in the first image data and each sheet represented in the second image data. Specifically, the processor 36 associates the front side and the back side, which are represented at relatively the same position in the first image data and the second image data, as the sides of the same sheet.

With reference to FIG. 10, the front-side area 40a of the front side 40 is located at the upper left, and the back-side area 52a of the back side 52 is located at the upper left. Thus, since the relative position of the front-side area 40a on the first image 38 and the relative position of the back-side area 52a on the second image 50 are the same, the processor 36 associates the front side 40 and the back side 52 as the sides of the same sheet.

In a case where each sheet is turned over to scan the back side after scanning the front side, for the same sheet, it is assumed that the sheet is placed in almost the same position between when the front side is scanned and when the back side is scanned. Based on this assumption, the processor 36 associates the front side 40 and the back side 52 with the same relative position, as the sides of the same sheet.

In the example shown in FIG. 10, the front side 42 and back side 54 are associated, the front side 44 and back side 56 are associated, the front side 46 and back side 58 are associated, and the front side 48 and back side 60 are associated.

By using the relative positional relationship, even in a case where the position of the sheet changes between when reading the front side and when reading the back side, in a case where the relative positional relationship is maintained, the front side and the back side may be associated.

The processor 36 may associate the front side and the back side, based on either the relative positional relationship or the distance positional relationship, or may associate the front side and the back side, based on both the relative positional relationship and the distance positional relationship.

Figure 11:
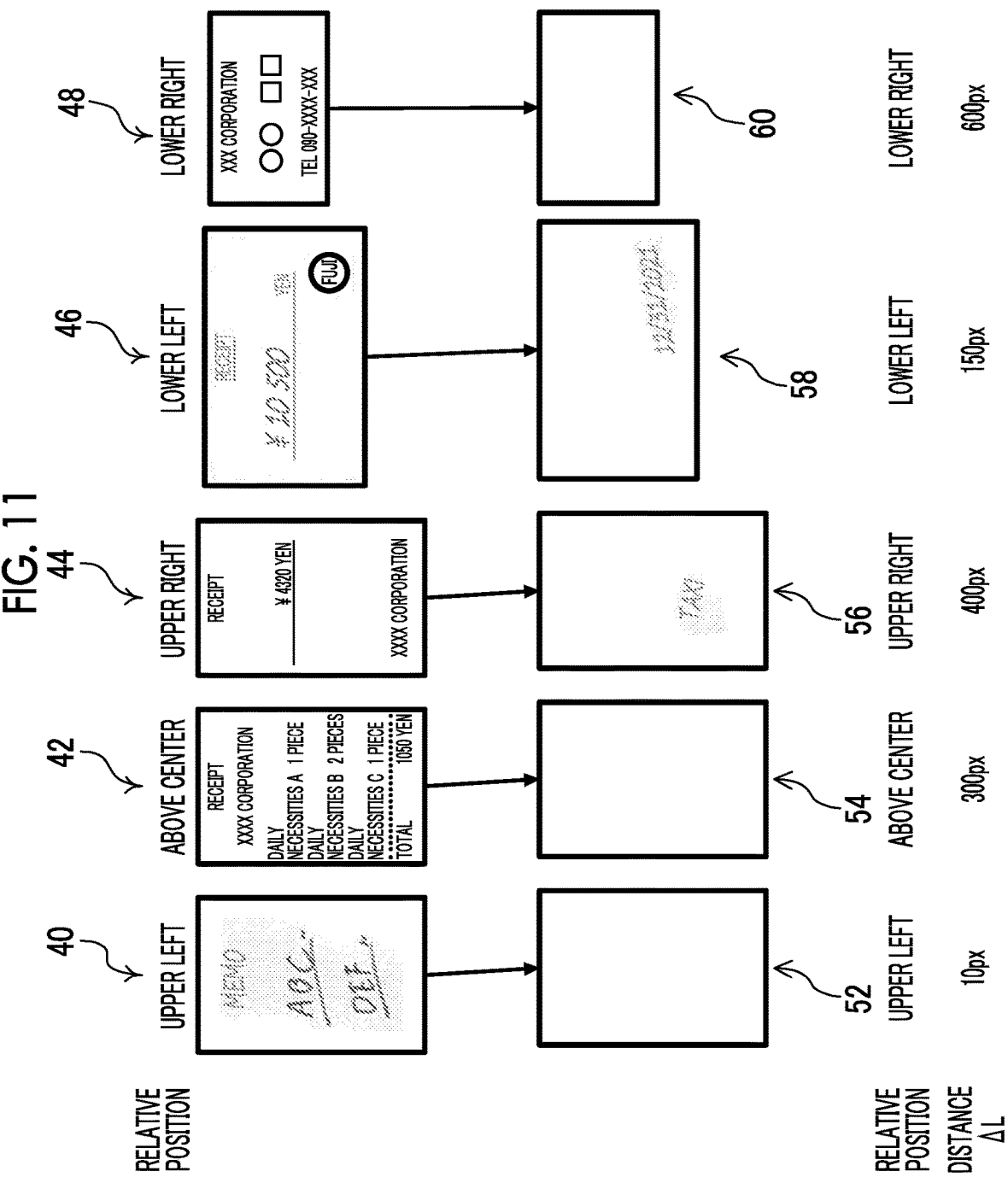
FIG. 11 is a diagram showing the distance and relative positional relationship between the front side and the back side.

With reference to FIG. 11, the process of associating the front side and the back side based on both the relative positional relationship and the distance positional relationship will be described. FIG. 11 is a diagram showing the distance and relative positional relationship between the front side and the back side.

The processor 36 may associate the front side and the back side, which are represented at relatively the same position in the first image data and the second image data and have the smallest distance difference ΔL, as the sides of the same sheet.

In the example shown in FIG. 11, the relative position of the front-side area 40a of the front side 40 and the relative position of the back-side area 52a of the back side 52 are the same, and the difference ΔL is the smallest. Therefore, the processor 36 associates the front side 40 and the back side 52 as the sides of the same sheet. The same applies to other sides.

In a case where the number of sheets represented in the first image data and the number of sheets represented in the second image data are different, the processor 36 may associate the front side and the back side of each sheet with each other, based on the distance between each sheet represented in the first image data and each sheet represented in the second image data. That is, in a case where the number of sheets differs between when reading the front side and when reading the back side, the processor 36 associates the front side with the back side, based on the distance relationship.

Figure 12:
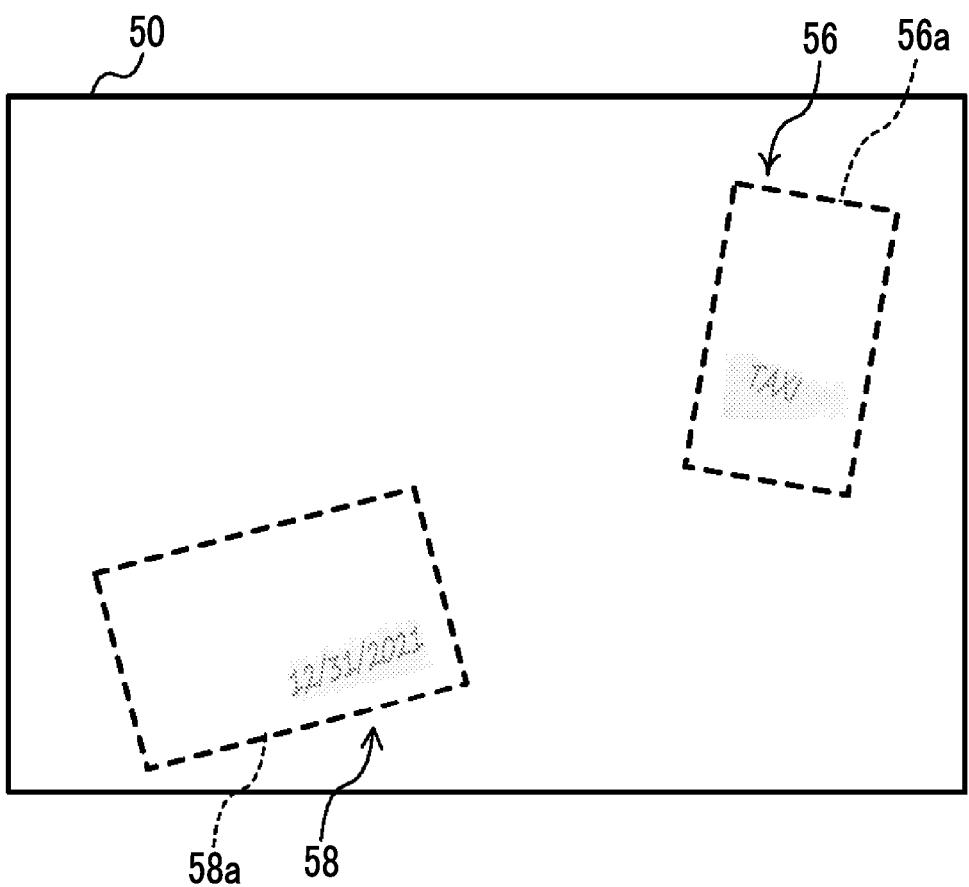
FIG. 12 is a diagram showing the areas of the back sides.
Figure 13:
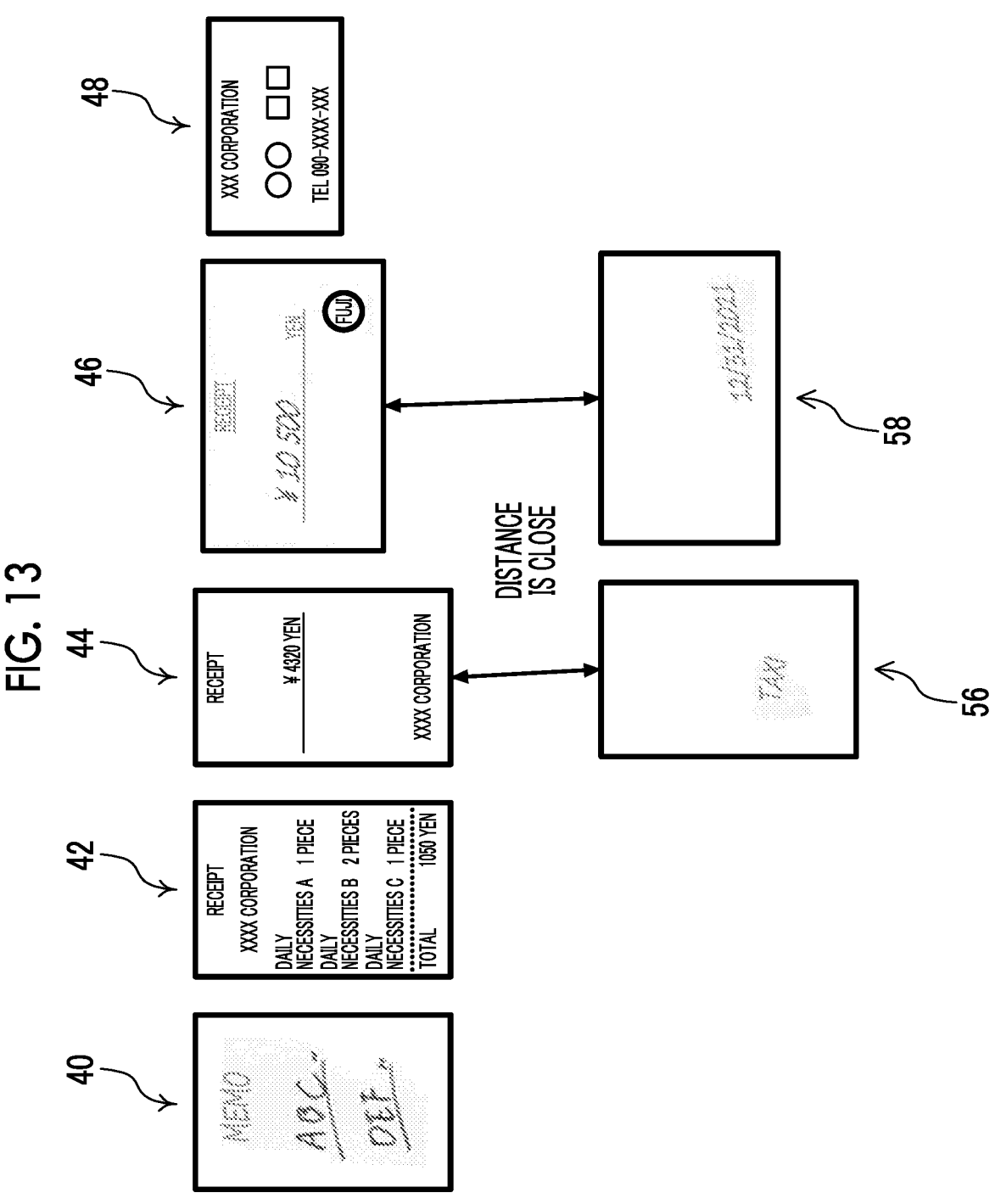
FIG. 13 is a diagram showing the distance between the front side and the back side.

A process when the number of sheets differs between when reading the front side and when reading the back side will be described below with reference to FIGS. 4, 12 and 13. FIG. 12 is a diagram showing the areas of the back sides. FIG. 13 is a diagram showing the distances between the front sides and the back sides.

Five sheets are scanned when reading the front side, and as a result, first image data representing the front sides 40, 42, 44, 46 and 48 are generated, as shown in FIG. 4.

On the other hand, two sheets are scanned when reading the back side, and as a result, second image data representing the back sides 56 and 58 are generated, as shown in FIG. 12. For example, it is conceivable that the back side is scanned only for sheets with descriptions on the back side.

In this way, in a case where the number of front sides and the number of back sides are different, the processor 36 calculates the distance of each front side and the distance of each back side and calculates a difference ΔL between the distance of the front side and the distance of the back side, as described with reference to FIGS. 7 and 8. The processor 36 associates the front side and the back side with the smallest difference ΔL as the sides of the same sheet.

In the example shown in FIG. 13, the processor 36 associates the front side 44 and the back side 56 as the sides of the same sheet, and associates the front side 46 and the back side 58 as the sides of the same sheet.

In this way, even in a case where the number of front sides and the number of back sides are different, the front sides and the back sides may be appropriately associated by using the distance relationship.

Note that in a case where the relative positional relationship of each sheet is specified based on the first image data and the relative positional relationship of each sheet is specified based on the second image data, in a case where the number of front sides and the number of back sides are different, the processor 36 may associate the front sides and the back sides by using the distance relationship.

In a case where the number of sheets represented in the first image data and the number of sheets represented in the second image data are the same, the processor 36 may associate the front side and the back side of each sheet with each other, based on the relative positional relationship between each sheet represented in the first image data and each sheet represented in the second image data. For example, as described with reference to FIGS. 4, 6 and 10, the processor 36 associates the front side and the back side. Even in a case where the position of the sheet changes between when reading the front side and when reading the back side, in a case where the relative positional relationship is maintained, the front side and the back side may be properly associated.

The processor 36 may associate the front side with the back side, based on the positional relationship of the sheet and the attribute similarity of the sheet. The attribute similarity is the similarity between the attribute of each sheet represented in the first image data and the attribute of each sheet represented in the second image data.

For example, the processor 36 specifies one or a plurality of combinations of the front side and the back side with similarity greater than or equal to a threshold, and associates the front side and the back side, based on the positional relationship of the sheet, for the one or the plurality of combinations. The threshold may be predetermined or may be changed by the user.

At least one of the size, shape, color, material, thickness of the sheet, or the shape of the fingerprint attached to the sheet is used as the attribute of the sheet, for example. The smaller the difference between the size of the front side and the size of the back side, the higher the similarity between the front side and the back side. The smaller the difference between the shape of the front side and the shape of the back side, the higher the similarity between the front side and the back side. The smaller the difference between the color of the front side and the color of the back side, the higher the similarity between the front side and the back side. As the material of the sheet of the front side and the material of the sheet of the back side tend to be the same or closer, the similarity between the front side and the back side increases. The smaller the difference between the thickness of the sheet on the front side and the thickness of the sheet on the back side, the higher the similarity between the front side and the back side. With respect to the materials of the sheet, based on the reflection of light, it is possible to distinguish whether the sheet is unprocessed sheet (that is, sheet without a surface coating), glossy sheet (paper with surface gloss coating), matte sheet (that is, paper with surface matte coating), or the like. Further, by comparing the state of the fibers of the sheet obtained from the high-definition image, it is possible to distinguish whether the sheet is unprocessed sheet such as high-quality sheet, plain sheet, recycled sheet, Japanese sheet, or the like. The thickness of the sheet can be determined by using the state of show-through (for example, the degree of transparency), or the like.

Figure 14:
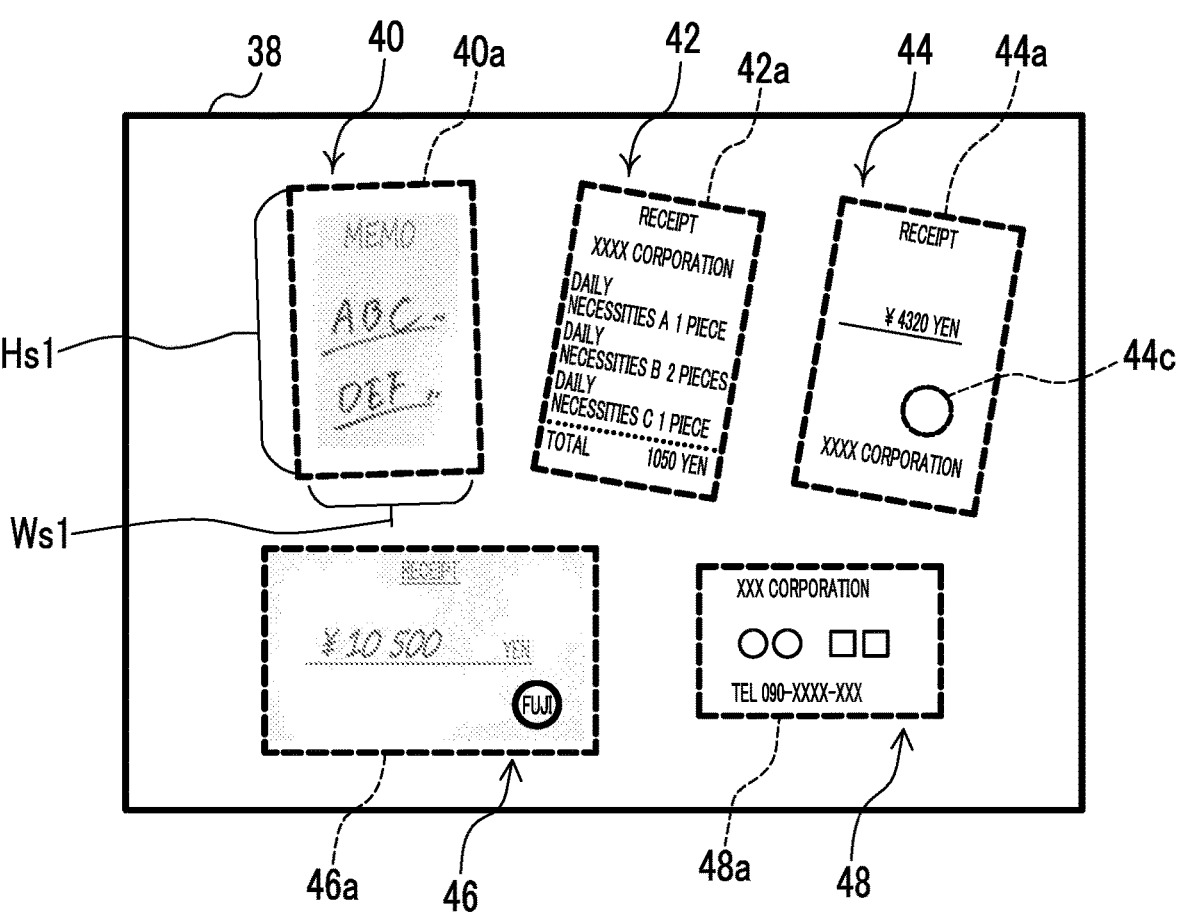
FIG. 14 is a diagram showing the areas of the front sides.
Figure 15:
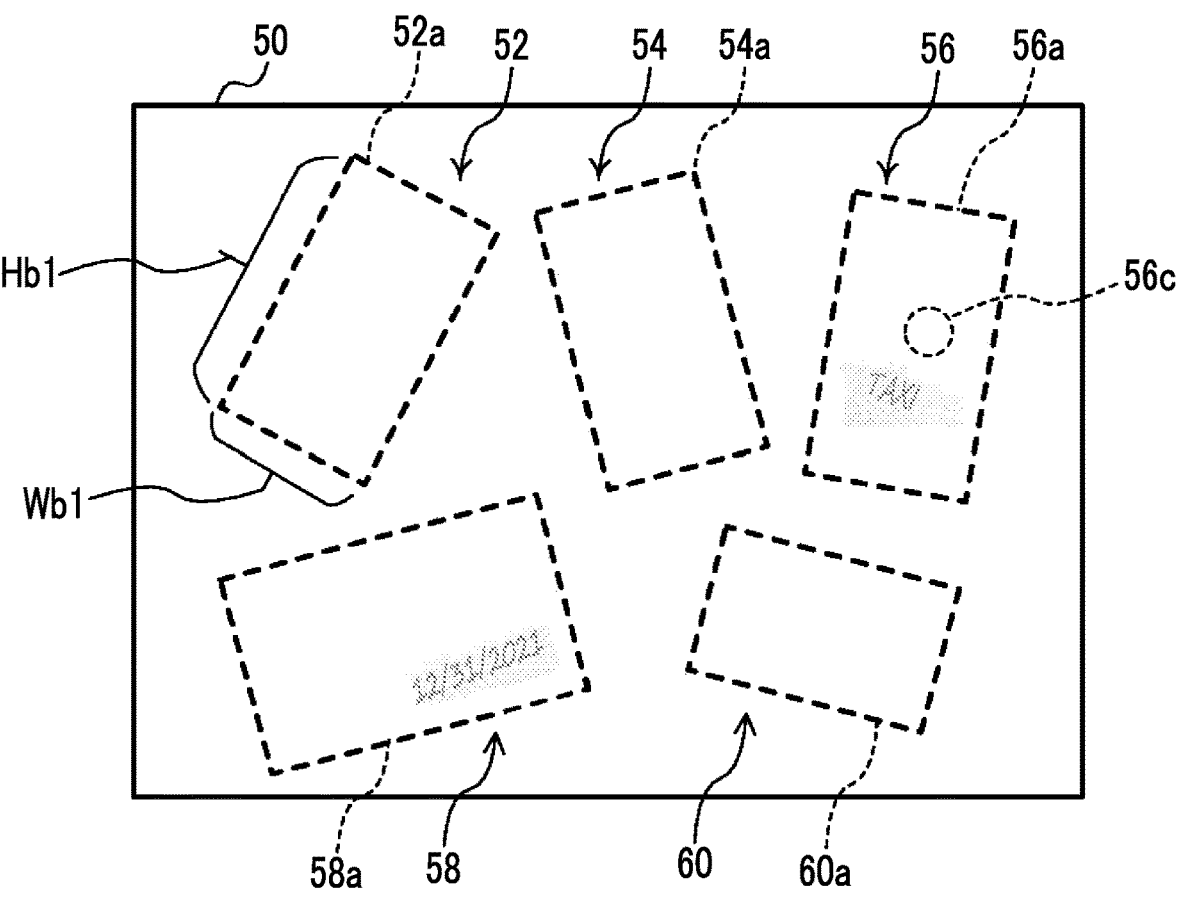
FIG. 15 is a diagram showing the areas of the back sides.

The attributes of a sheet will be described with reference to FIGS. 14 and 15. FIG. 14 is a diagram showing the areas of the front sides. FIG. 15 is a diagram showing the areas of the back sides. Here, as an example, the size and color of a sheet are used as attributes of the sheet.

The processor 36 calculates the size of the front-side area of each front side and the pixel values of the white portions (that is, the portions without texts, graphics, or the like) of each front side. Similarly, the processor 36 calculates the size of the back-side area of each back side and the pixel value of the white portion of each back side.

For example, as shown in FIG. 14, the processor 36 calculates the vertical length Hs1 and the horizontal length Ws1 of the rectangular front-side area 40a as the size of the front-side area 40a. The processor 36 similarly calculates the vertical lengths and the horizontal lengths even for other front-side areas.

Further, as shown in FIG. 14, the processor 36 calculates the pixel value of the white portion 44c of the front side 44 as the color of the front side 44. The processor 36 similarly calculates the pixel values of the white portions for the other front sides.

As shown in FIG. 15, the processor 36 calculates the vertical length Hb1 and the horizontal length Wb1 of the back-side area 52a as the size of the back-side area 52a. The processor 36 similarly calculates the vertical length and horizontal length for other back-side areas.

Further, as shown in FIG. 15, the processor 36 calculates the pixel value of the white portion 56c of the back side 56 as the color of the back side 56. The processor 36 similarly calculates the pixel values of the white portions for the other back sides.

Note that the processor 36 may calculate the area of the front-side area as the size of the front-side area and the area of the back-side area as the size of the back-side area. For example, in a case where the sheet is not rectangular, the processor 36 may calculate the area of each of the front-side area and the back-side area as the size. Of course, regardless of the shape of the sheet, the processor 36 may calculate the area as the size.

The processor 36 compares the size of each front-side area (for example, the vertical length and the horizontal length) to the size of each back-side area (for example, the vertical length and the horizontal length). The processor 36 may compare the area of each front-side area to the area of each back-side area. The processor 36 sets the similarity between the front side and the back side with a small size difference to a higher value than the similarity between the front side and the back side with a large size difference.

Further, the processor 36 compares the color of each front side (for example, the pixel value of the white portion) with the color of each back side (for example, the pixel value of the white portion). The processor 36 sets the similarity between the front side and the back side with a small color difference to a higher value than the similarity between the front side and the back side with a large color difference.

Figure 16:
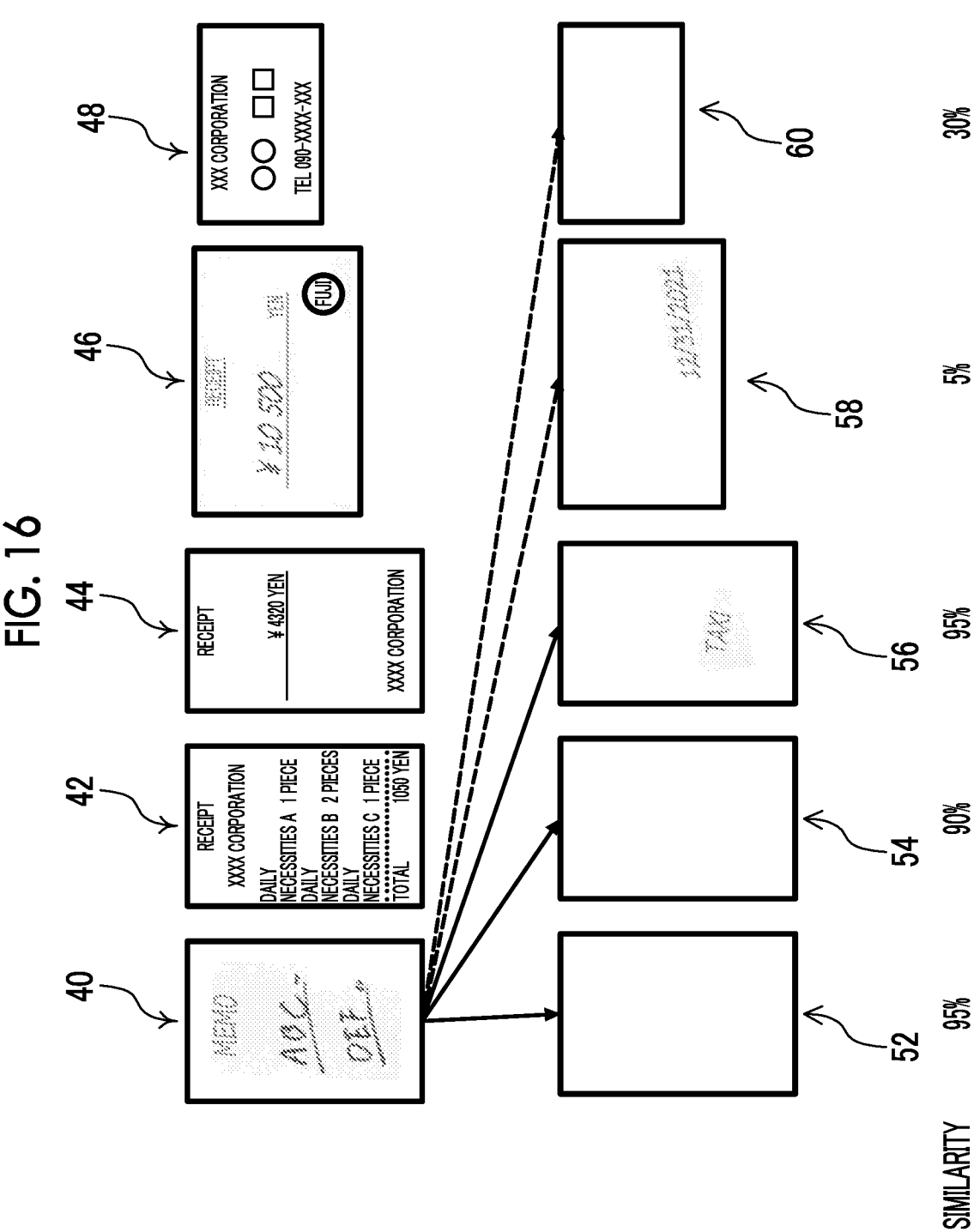
FIG. 16 is a diagram showing a similarity between the front side and the back side.

FIG. 16 shows an example of the similarity between the front side and the back side.

The similarity between the front side 40 and the back side 52 is 95%. The similarity between the front side 40 and the back side 54 is 90%. The similarity between the front side 40 and the back side 56 is 95%. The similarity between the front side 40 and the back side 58 is 5%. The similarity between the front side 40 and the back side 60 is 30%.

For example, a threshold of 75% is defined, and the processor 36 specifies combinations of the front side and the back side having a similarity of 75% or higher. In the example shown in FIG. 16, the back sides combined with the front side 40 are the back sides 52, 54 and 56.

The processor 36 specifies the back sides associated with the front sides 40 for the back sides 52, 54, and 56, based on the positional relationship between the front-side area and the back-side area, and associates the specified back side with the front side 40. At least one positional relationship of a relative positional relationship or a distance positional relationship is used as the positional relationship.

The processor 36 does not calculate the positional relationship between the front-side area and the back-side area, with respect to the back sides 58 and 60. This reduces the amount of calculation, compared to the case where the positional relationship between the front-side area and the back-side area is calculated for all the back sides including the back sides 58 and 60, without using the similarity.

The processor 36 may associate the front side and the back side, based on the similarity, without using the positional relationship. For example, the processor 36 associates the front side with the back side with the highest similarity. In a case where there are a plurality of combinations of the front side and the back side with the highest similarity, the processor 36 may select one combination from among the plurality of combinations to associate the front side and the back side.

In the example shown in FIG. 16, the similarity of each of the back sides 52 and 56 to the front side 40 is 95%, and each similarity is the highest value. In this case, the processor 36 associates either the back side 52 or the back side 56 with the front side 40. The processor 36 may associate one or a plurality of front sides with one or a plurality of back sides. In the example shown in FIG. 16, the processor 36 may associate both the back sides 52 and 56 with the front side 40.

In a case where there are a plurality of combinations of the front side and the back side with the highest similarity, the processor 36 may associate the front side and the back side by further using the positional relationship, and in a case where there is one combination, the processor 36 may associate the front side and the back side, based on the similarity, without using the positional relationship.

The process by the candidate determination unit 24 will be described below. As described above, the process by the candidate determination unit 24 is implemented by the processor 36.

Figure 17:
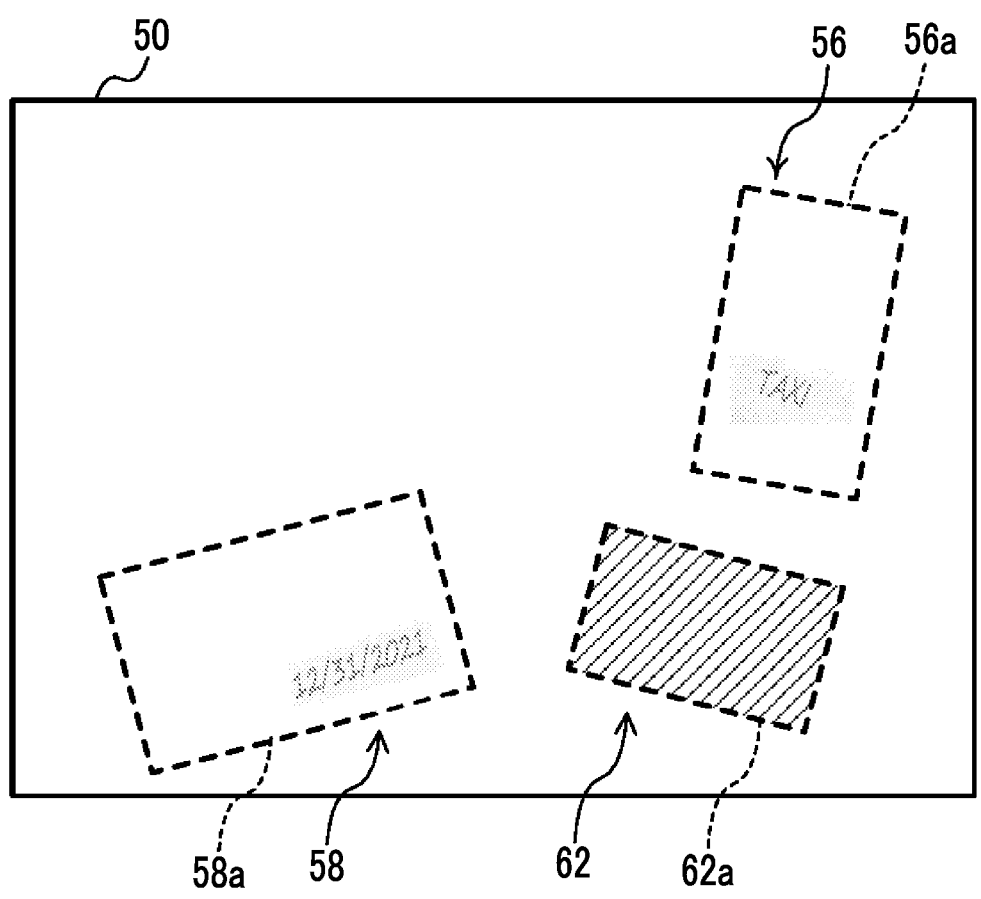
FIG. 17 is a diagram showing the areas of the back sides.
Figure 18:
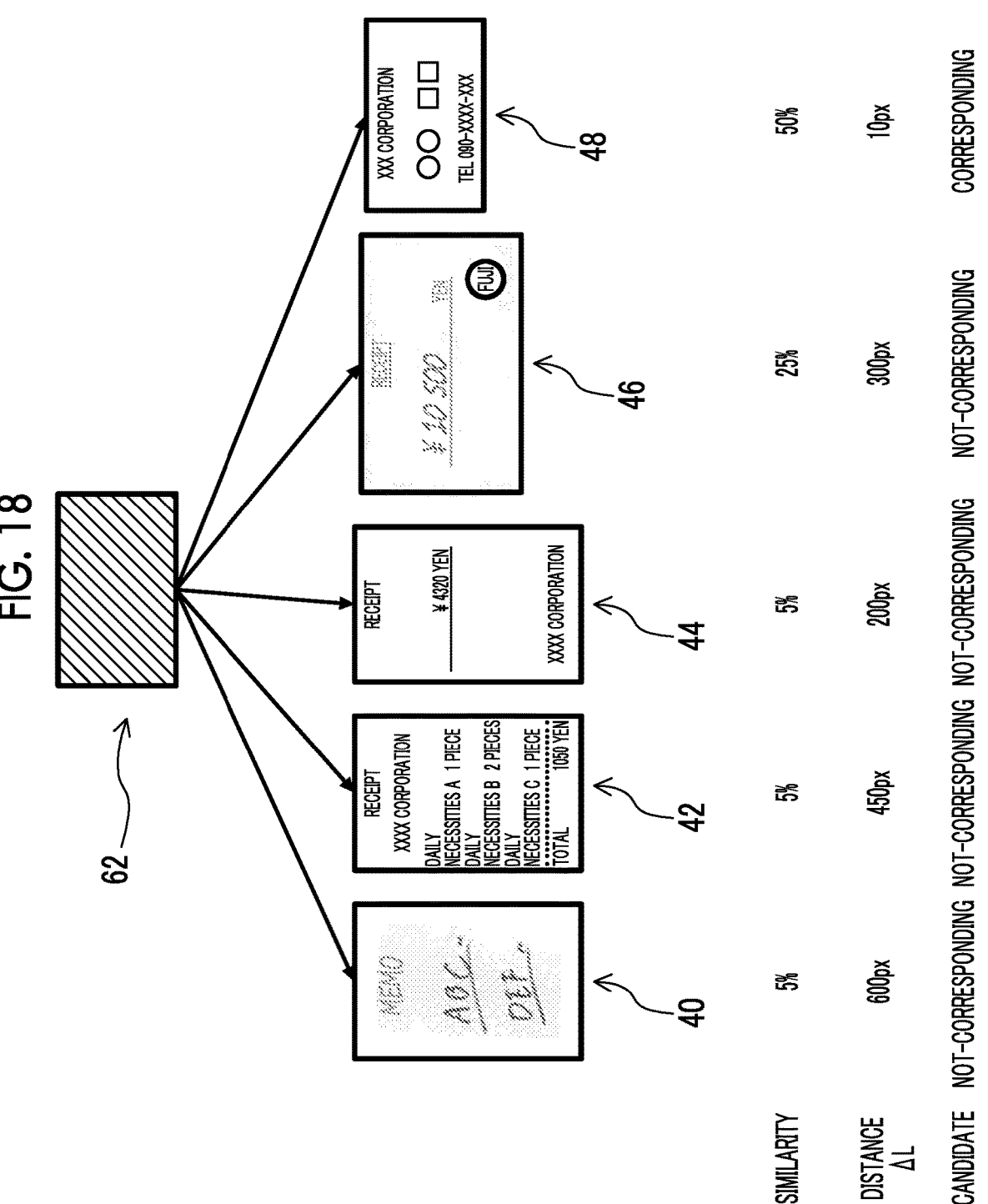
FIG. 18 is a diagram showing the distance and similarity between the front side and the back side.

The processor 36 determines candidates for the sheets to be associated between the front side and the back side, based on at least one of the positional relationship or attribute similarity of the sheet. A process of determining sheet candidates will be described below with reference to FIGS. 4, 17, and 18. FIG. 17 is a diagram showing the areas of the back sides. FIG. 18 is a diagram showing the distance and similarity between the front side and the back side.

Five sheets are scanned when reading the front side, and as a result, first image data representing the front sides 40, 42, 44, 46 and 48 are generated, as shown in FIG. 4.

On the other hand, three sheets are scanned when reading the back side, and as a result, second image data representing the back sides 56, 58, and 62 are generated, as shown in FIG. 17.

Here, as an example, the back side 62 is assumed to be the side of the sheet F different from the sheets A, B, C, D, and E.

The back side 62 is located closest to the front side 48 compared to the other back sides (see FIGS. 4 and 17), and the difference $\Delta L$ between the back side 62 and the front side 48 is minimum. Further, the relative position of the back side 62 on the second image 50 and the relative position of the front side 48 on the first image 38 match. Therefore, by using the positional relationship, the front side 48 and the back side 62 are associated as the sides of the same sheet (for example, sheet E). However, the back side 62 is actually not the back side of the sheet E, but the back side of the sheet F different from the sheet E, so the association is not correct. In this case, the processor 36 determines candidates for the sheets for which the front side and the back side are associated, based on the attribute similarity.

FIG. 18 shows the similarity between the back side 62 and each of the front sides 40, 42, 44, 46 and 48 and the distance difference $\Delta L$. For example, each similarity is calculated by using the size, shape, and color of the sheet as attributes of the sheet. Both similarities are below a threshold (for example, 75%).

For example, the color of the entire surface of the back side 62 is yellow, and the color of the portions without texts or figures in each of the front sides 40, 42, 44, 46, and 48 is white. In this case, the similarity calculated based on the color is a low value.

Since the difference between the size of the back-side area 62*a* of the back side 62 and the size of the front-side area 48*a* of the front side 48 is small, and the shape of the back-side area 62*a* and the shape of the front-side area 48*a* are similar, the similarity is 50% that is higher than the similarities of other front sides. However, since the color of the back side 62 is still quite different from the color of the front side 48, the similarity is below the threshold.

Since both similarities are below the threshold, the processor 36 excludes the back side 62 from the candidates for the front sides and the back sides to be associated, and treats the back side 62 as the side of another sheet. This prevents the front side 48 from being associated with the back side 62 of a sheet different from the sheet E having the front side 48.

Note that the processor 36 may determine a candidate for association based on the positional relationship, or may determine a candidate for association based on both the positional relationship and the attribute similarity.

The process by the blank sheet determination unit 26 will be described below. As described above, the process by the blank sheet determination unit 26 is implemented by the processor 36.

The processor 36 determines whether or not the front side of the sheet is blank, based on the first image data, and determines whether or not the back side of the sheet is blank, based on the second image data. The processor 36 may determine whether or not the sheet is blank for both the front side and the back side, or may determine whether or not the sheet is blank for either the front side or the back side.

In a case where there are no texts or figures on the front side (for example, in a case where texts or figures are not detected from the front side), the processor 36 determines that the front side is blank, and in a case where there are texts or figures on the front side (for example, in a case where texts or figures are detected from the front side), the processor 36 determines that the front side is not blank. The processor 36 similarly determines whether or not the back side is blank.

Figure 19:
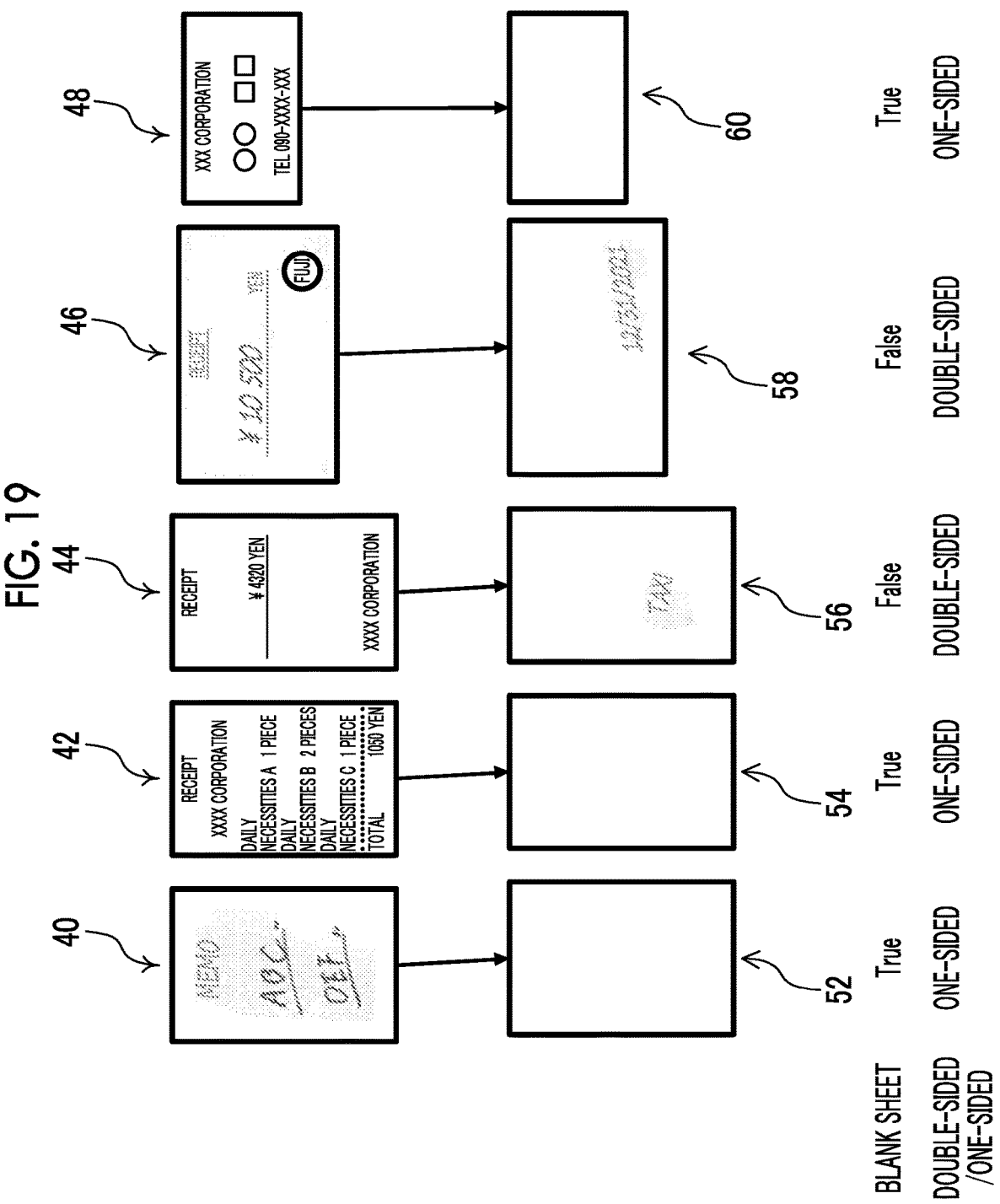
FIG. 19 is a diagram showing a result of blank sheet determination.

The blank sheet determination process will be described with reference to FIG. 19. FIG. 19 is a diagram showing a result of blank sheet determination.

The front side 40 of the sheet A has been determined not to be blank, and the back side 52 of the sheet A has been determined to be blank (blank sheet=True, one-sided). The front side 42 of the sheet B has been determined not to be blank, and the back side 54 of the sheet B has been determined to be blank (blank sheet=True, one-sided). It is determined that the front side 44 and the back side 56 of the sheet C are not blank (blank sheet=False, both-sided). It is determined that the front side 46 and the back side 58 of the sheet D are not blank (blank sheet=False, both-sided). The front side 48 of the sheet E has been determined not to be blank, and the back side 60 of the sheet E has been determined to be blank (blank sheet=True, one-sided).

Thus, it is determined whether or not the sheet is blank. The user may turn over the sheet without determining whether or not the sheet is blank.

For example, in a case where the one side of the sheet is blank, it is considered that the user may determine whether or not the sheet is blank under the condition that the front side and the back side of the sheet are not associated with each other. In this case, the user needs to check whether or not the sheet is blank.

On the other hand, in a case where the processor 36 determines whether or not the sheet is blank, the user does not need to determine whether or not the sheet is blank by himself, but turns the sheet over and performs scanning, so that it is automatically determined whether or not the sheet is blank. This reduces the user's trouble.

The functions of the image processing apparatus 10 described above are implemented by cooperation of hardware and software, for example. For example, the function of each apparatus is implemented by the processor reading and executing the program stored in the memory of each apparatus. The program is stored in the memory via a recording medium such as a CD or DVD, or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
    receive first image data representing front sides of a plurality of sheets, that is generated by reading the front sides of the plurality of sheets;
    receive second image data representing back sides of the plurality of sheets, that is generated by reading the back sides of the plurality of sheets; and
    associate a front side and a back side of each sheet with each other, based on a positional relationship between each sheet represented in the first image data and every sheet represented in the second image data.

2. The information processing apparatus according to claim 1,
    wherein the positional relationship includes a relative positional relationship between each sheet represented in the first image data and each sheet represented in the second image data.

3. The information processing apparatus according to claim 2, wherein the positional relationship includes a relationship regarding a distance between each sheet represented in the first image data and each sheet represented in the second image data.

4. The information processing apparatus according to claim 2, wherein the processor is configured to:

associate the front side and the back side of each sheet with each other, based on the positional relationship and a similarity between an attribute of each sheet represented in the first image data and an attribute of each sheet represented in the second image data.

5. The information processing apparatus according to claim 3, wherein the processor is configured to:

in a case where the number of sheets represented in the first image data and the number of sheets represented in the second image data are different, associate the front side and the back side of each sheet with each other, based on the distance between each sheet represented in the first image data and each sheet represented in the second image data.

6. The information processing apparatus according to claim 3, wherein the processor is configured to:

associate the front side and the back side of each sheet with each other, based on the positional relationship and a similarity between an attribute of each sheet represented in the first image data and an attribute of each sheet represented in the second image data.

7. The information processing apparatus according to claim 5, wherein the processor is configured to:

in a case where the number of sheets represented in the first image data and the number of sheets represented in the second image data are the same, associate the front side and the back side of each sheet with each other, based on a relative positional relationship between each sheet represented in the first image data and each sheet represented in the second image data.

8. The information processing apparatus according to claim 5, wherein the processor is configured to:

associate the front side and the back side of each sheet with each other, based on the positional relationship and a similarity between an attribute of each sheet represented in the first image data and an attribute of each sheet represented in the second image data.

9. The information processing apparatus according to claim 7, wherein the processor is configured to:

associate the front side and the back side of each sheet with each other, based on the positional relationship and a similarity between an attribute of each sheet represented in the first image data and an attribute of each sheet represented in the second image data.

10. The information processing apparatus according to claim 1, wherein the positional relationship includes a relationship regarding a distance between each sheet represented in the first image data and each sheet represented in the second image data.

11. The information processing apparatus according to claim 10, wherein the processor is configured to:

in a case where the number of sheets represented in the first image data and the number of sheets represented in the second image data are different, associate the front side and the back side of each sheet with each other, based on the distance between each sheet represented in the first image data and each sheet represented in the second image data.

12. The information processing apparatus according to claim 10, wherein the processor is configured to:

associate the front side and the back side of each sheet with each other, based on the positional relationship and a similarity between an attribute of each sheet represented in the first image data and an attribute of each sheet represented in the second image data.

13. The information processing apparatus according to claim 11, wherein the processor is configured to:

in a case where the number of sheets represented in the first image data and the number of sheets represented in the second image data are the same, associate the front side and the back side of each sheet with each other, based on a relative positional relationship between each sheet represented in the first image data and each sheet represented in the second image data.

14. The information processing apparatus according to claim 11, wherein the processor is configured to:

associate the front side and the back side of each sheet with each other, based on the positional relationship and a similarity between an attribute of each sheet represented in the first image data and an attribute of each sheet represented in the second image data.

15. The information processing apparatus according to claim 13, wherein the processor is configured to:

associate the front side and the back side of each sheet with each other, based on the positional relationship and a similarity between an attribute of each sheet represented in the first image data and an attribute of each sheet represented in the second image data.

16. The information processing apparatus according to claim 1, wherein the processor is configured to:

associate the front side and the back side of each sheet with each other, based on the positional relationship and a similarity between an attribute of each sheet represented in the first image data and an attribute of each sheet represented in the second image data.

17. The information processing apparatus according to claim 16, wherein the attribute includes at least one of size, material, shape, thickness, or color of the sheet.

18. The information processing apparatus according to claim 1, wherein the processor is configured to:

further determine whether or not the front side or the back side of the sheet is blank, based on the first image data or the second image data.

19. A non-transitory computer readable medium storing a program causing a computer to:

receive first image data representing front sides of a plurality of sheets, that is generated by reading the front sides of the plurality of sheets;

receive second image data representing back sides of the plurality of sheets, that is generated by reading the back sides of the plurality of sheets; and associate a front side and a back side of each sheet with each other, based on a positional relationship between each sheet represented in the first image data and every sheet represented in image data of the back side.

20. An information processing method comprising:

receiving first image data representing front sides of a plurality of sheets, that is generated by reading the front sides of the plurality of sheets;

receiving second image data representing back sides of the plurality of sheets, that is generated by reading the back sides of the plurality of sheets; and associating a front side and a back side of each sheet with each other, based on a positional relationship between each sheet represented in the first image data and every sheet represented in image data of the back side.

* * * * *